US012615671B2

(12) United States Patent
Ma et al.

(10) Patent No.: US 12,615,671 B2
(45) Date of Patent: Apr. 28, 2026

(54) SUPPORT FOR DEMODULATION REFERENCE SIGNAL BUNDLING BY A BASE STATION

(71) Applicant: QUALCOMM Incorporated, San Diego, CA (US)

(72) Inventors: Liangping Ma, San Diego, CA (US); Gokul Sridharan, Sunnyvale, CA (US); Mahmoud Taherzadeh Boroujeni, San Diego, CA (US); Xiao Feng Wang, San Diego, CA (US); Hung Dinh Ly, San Diego, CA (US); Peter Gaal, San Diego, CA (US); Alberto Rico Alvarino, San Diego, CA (US); Yi Huang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 18/045,776

(22) Filed: Oct. 11, 2022

(65) Prior Publication Data

US 2023/0119776 A1 Apr. 20, 2023

Related U.S. Application Data

(60) Provisional application No. 63/262,606, filed on Oct. 15, 2021.

(51) Int. Cl.
*H04W 74/08* (2024.01)
*H04L 5/00* (2006.01)
(Continued)

(52) U.S. Cl.
CPC ....... *H04W 74/0841* (2013.01); *H04L 5/0051* (2013.01); *H04W 16/28* (2013.01); *H04W 84/06* (2013.01)

(58) Field of Classification Search
CPC . H04W 74/0841; H04W 16/28; H04W 84/06; H04L 5/0051
See application file for complete search history.

(56) References Cited

U.S. PATENT DOCUMENTS

2018/0109286 A1* 4/2018 Yao ........................ H04W 4/70
2018/0213484 A1* 7/2018 Oh ........................ H04W 52/42
(Continued)

FOREIGN PATENT DOCUMENTS

WO WO-2021164726 8/2021

OTHER PUBLICATIONS

International Search Report and Written Opinion—PCT/US2022/077958—ISA/EPO—Feb. 1, 2023.
(Continued)

*Primary Examiner* — Fahmida S Chowdhury
(74) *Attorney, Agent, or Firm* — Harrity & Harrity, LLP/QUALCOMM Incorporated

(57) ABSTRACT

Various aspects of the present disclosure generally relate to wireless communication. In some aspects, a user equipment (UE) may configure one or more transmission parameters to maintain a channel consistency for a transmission channel. The UE may transmit, via the transmission channel, a set of multiple communications using the one or more transmission parameters. Numerous other aspects are described.

43 Claims, 20 Drawing Sheets

(51) Int. Cl.
    *H04W 16/28*            (2009.01)
    *H04W 74/0833*      (2024.01)
    *H04W 84/06*           (2009.01)

(56)          References Cited

U.S. PATENT DOCUMENTS

| | | | |
|---|---|---|---|
| 2020/0162133 A1* | 5/2020 | Harrison | H04W 52/248 |
| 2020/0314910 A1* | 10/2020 | Höglund | H04W 48/10 |
| 2021/0014095 A1 | 1/2021 | Ly et al. | |
| 2022/0279523 A1* | 9/2022 | He | H04L 1/1864 |
| 2022/0353718 A1* | 11/2022 | Duan | H04W 24/10 |
| 2023/0029745 A1* | 2/2023 | Cui | H04W 72/0453 |
| 2023/0033400 A1* | 2/2023 | Maso | H04L 5/0053 |
| 2023/0037267 A1* | 2/2023 | Marcone | H04W 72/044 |
| 2023/0101476 A1* | 3/2023 | Ryu | H04L 5/0051 |
| | | | 370/329 |
| 2023/0119776 A1* | 4/2023 | Ma | H04L 5/0051 |
| | | | 370/329 |
| 2023/0291523 A1* | 9/2023 | Hasegawa | H04W 52/281 |
| 2024/0031095 A1* | 1/2024 | Sun | H04L 5/0016 |
| 2024/0073873 A1* | 2/2024 | Yao | H04W 72/0446 |
| 2024/0163135 A1* | 5/2024 | Liu | H04L 25/0228 |
| 2024/0187281 A1* | 6/2024 | Qiao | H04L 25/0204 |
| 2024/0214151 A1* | 6/2024 | Liu | H04L 5/0051 |
| 2024/0250794 A1* | 7/2024 | Liu | H04L 5/0094 |

OTHER PUBLICATIONS

Moderator (China Telecom) : "FL Summary#2 of Joint Channel Estimation for PUSCH", R1-2110502, 3GPP TSG RAN WG1 #106bis-e, 3rd Generation Partnership Project, Mobile Competence Centre, 650, Route Des Lucioles, F-06921 Sophia-Antipolis Cedex, France, Oct. 14, 2021, XP052061127, 99 Pages, p. 19, Middle Paragraph.

Moderator (China Telecom): "[106-e-NR-R17-CovEnh-03] Summary of Email Discussion on Joint Channel Estimation for PUSCH", R1-2108644, 3GPP TSG RAN WG1 #106-e, 3rd Generation Partnership Project, Mobile Competence Centre, 650, Route Des Lucioles, F-06921 Sophia-Antipolis Cedex, France, Sep. 1, 2021, XP052045284, 190 Pages, Section 2.1.

Partial International Search Report—PCT/US2022/077958—ISA/EPO—Dec. 23, 2022.

3GPP: "RAN1 Chair's Notes", 3GPP TSG RAN WG1 #106-e, e-Meeting, Aug. 16-27, 2021, 146 Pages.

* cited by examiner

500

810  Configure one or more transmission parameters to maintain a channel consistency for a transmission channel 820  Transmit, via the transmission channel, a set of multiple communications using the one or more transmission parameters

800

Perform one or more procedures that support demodulation reference signal (DMRS) bundling by a base station

910

Transmit set of multiple communications based at least in part on the one or more procedures

920

900

1010   Configure one or more transmission parameters to maintain a channel consistency for a transmission channel 1020   Transmit an indication, within a set of multiple communications, indicating application of the one or more transmission parameters associated with maintenance of the channel consistency for the set of multiple communications

1000

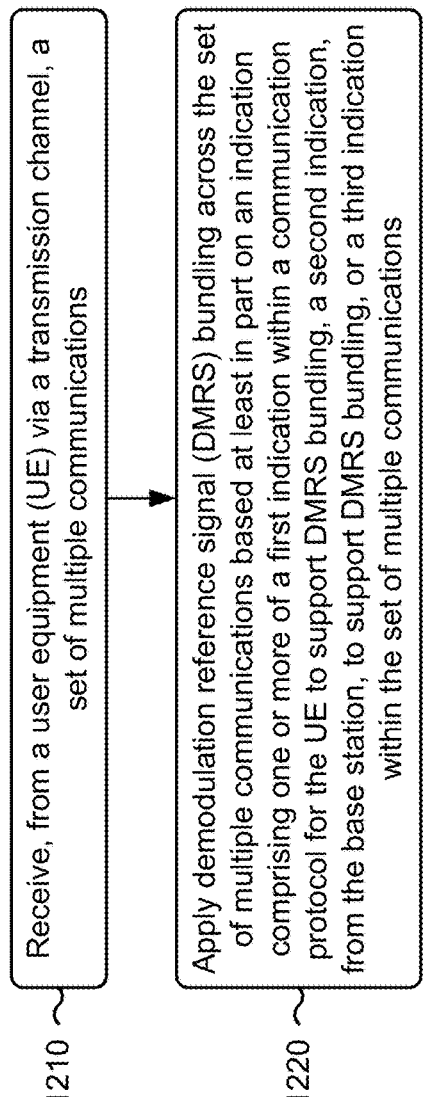

Receive, from a user equipment (UE) via a transmission channel, a set of multiple communications Apply demodulation reference signal (DMRS) bundling across the set of multiple communications based at least in part on an indication comprising one or more of a first indication within a communication protocol for the UE to support DMRS bundling, a second indication, from the base station, to support DMRS bundling, or a third indication within the set of multiple communications

1310 — Receive, from a user equipment (UE) via a transmission channel, a set of multiple communications 1320 — Apply demodulation reference signal (DMRS) bundling across the set of multiple communications based at least in part on an indication within the set of multiple communications

1300

SUPPORT FOR DEMODULATION REFERENCE SIGNAL BUNDLING BY A BASE STATION

REFERENCE TO RELATED APPLICATION

This Patent Application claims priority to U.S. Provisional Patent Application No. 63/262,606, filed on Oct. 15, 2021, entitled "SUPPORT FOR DEMODULATION REFERENCE SIGNAL BUNDLING BY A BASE STATION," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for reference signal bundling.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

Preferably, these improvements should be applicable to other multiple access technologies and the telecommunication standards that employ these technologies.

SUMMARY

Some aspects described herein relate to a method of wireless communication performed at a user equipment (UE). The method may include configuring one or more transmission parameters to maintain a channel consistency for a transmission channel. The method may include transmitting, via the transmission channel, a set of multiple communications using the one or more transmission parameters.

Some aspects described herein relate to a method of wireless communication performed at a UE. The method may include performing one or more procedures that support demodulation reference signal (DMRS) bundling at a base station. The method may include transmitting set of multiple communications based at least in part on the one or more procedures.

Some aspects described herein relate to a method of wireless communication performed at a UE. The method may include configuring one or more transmission parameters to maintain a channel consistency for a transmission channel. The method may include transmitting an indication, within a set of multiple communications, indicating application of the one or more transmission parameters associated with maintenance of the channel consistency for the set of multiple communications.

Some aspects described herein relate to a method of wireless communication performed at a UE. The method may include performing one or more procedures that support DMRS bundling at a base station. The method may include transmitting an indication, within a set of multiple communications, indicating performance of the one or more procedures that support the DMRS bundling for the set of multiple communications.

Some aspects described herein relate to a method of wireless communication performed at a base station. The method may include receiving, from a UE via a transmission channel, a set of multiple communications. The method may include applying DMRS bundling across the set of multiple communications based at least in part on an indication comprising one or more of: a first indication within a communication protocol for the UE to support DMRS bundling, a second indication, from the base station, to support DMRS bundling, or a third indication within the set of multiple communications.

Some aspects described herein relate to a method of wireless communication performed at a base station. The method may include receiving, from a UE via a transmission channel, a set of multiple communications. The method may include applying DMRS bundling across the set of multiple communications based at least in part on an indication within the set of multiple communications.

Some aspects described herein relate to a UE for wireless communication. The user equipment may include a memory and one or more processors coupled to the memory. The one or more processors may be configured to configure one or more transmission parameters to maintain a channel consistency for a transmission channel. The one or more processors may be configured to transmit, via the transmission channel, a set of multiple communications using the one or more transmission parameters.

Some aspects described herein relate to a UE for wireless communication. The UE may include a memory and one or more processors coupled to the memory. The one or more processors may be configured to perform one or more procedures that support DMRS bundling at a base station. The one or more processors may be configured to transmit set of multiple communications based at least in part on the one or more procedures.

Some aspects described herein relate to a UE for wireless communication. The UE may include a memory and one or more processors coupled to the memory. The one or more processors may be configured to configure one or more transmission parameters to maintain a channel consistency for a transmission channel. The one or more processors may be configured to transmit an indication, within a set of multiple communications, indicating application of the one or more transmission parameters associated with mainte-nance of the channel consistency for the set of multiple communications.

Some aspects described herein relate to a UE for wireless communication. The UE may include a memory and one or more processors coupled to the memory. The one or more processors may be configured to perform one or more procedures that support DMRS bundling at a base station. The one or more processors may be configured to transmit an indication, within a set of multiple communications, indicating performance of the one or more procedures that support the DMRS bundling for the set of multiple commu-nications.

Some aspects described herein relate to a base station for wireless communication. The base station may include a memory and one or more processors coupled to the memory. The one or more processors may be configured to receive, from a UE via a transmission channel, a set of multiple communications. The one or more processors may be con-figured to apply DMRS bundling across the set of multiple communications based at least in part on an indication comprising one or more of: a first indication within a communication protocol for the UE to support DMRS bundling, a second indication, from the base station, to support DMRS bundling, or a third indication within the set of multiple communications.

Some aspects described herein relate to a base station for wireless communication. The base station may include a memory and one or more processors coupled to the memory. The one or more processors may be configured to receive, from a UE via a transmission channel, a set of multiple communications. The one or more processors may be con-figured to apply DMRS bundling across the set of multiple communications based at least in part on an indication within the set of multiple communications.

Some aspects described herein relate to a non-transitory computer-readable medium that stores a set of instructions for wireless communication by a UE. The set of instructions, when executed by one or more processors of the UE, may cause the UE to configure one or more transmission param-eters to maintain a channel consistency for a transmission channel. The set of instructions, when executed by one or more processors of the UE, may cause the UE to transmit, via the transmission channel, a set of multiple communica-tions using the one or more transmission parameters.

Some aspects described herein relate to a non-transitory computer-readable medium that stores a set of instructions for wireless communication by a UE. The set of instructions, when executed by one or more processors of the UE, may cause the UE to perform one or more procedures that support DMRS bundling at a base station. The set of instructions, when executed by one or more processors of the UE, may cause the UE to transmit set of multiple communications based at least in part on the one or more procedures.

Some aspects described herein relate to a non-transitory computer-readable medium that stores a set of instructions for wireless communication by a UE. The set of instructions, when executed by one or more processors of the UE, may cause the UE to configure one or more transmission param-eters to maintain a channel consistency for a transmission channel. The set of instructions, when executed by one or more processors of the UE, may cause the UE to transmit an indication, within a set of multiple communications, indi-cating application of the one or more transmission param-eters associated with maintenance of the channel consis-tency for the set of multiple communications.

Some aspects described herein relate to a non-transitory computer-readable medium that stores a set of instructions for wireless communication by a UE. The set of instructions, when executed by one or more processors of the UE, may cause the UE to perform one or more procedures that support DMRS bundling by a base station. The set of instructions, when executed by one or more processors of the UE, may cause the UE to transmit an indication, within a set of multiple communications, indicating performance of the one or more procedures that support the DMRS bundling for the set of multiple communications.

Some aspects described herein relate to a non-transitory computer-readable medium that stores a set of instructions for wireless communication by a base station. The set of instructions, when executed by one or more processors of the base station, may cause the base station to receive, from a UE via a transmission channel, a set of multiple commu-nications. The set of instructions, when executed by one or more processors of the base station, may cause the base station to apply DMRS bundling across the set of multiple communications based at least in part on an indication comprising one or more of: a first indication within a communication protocol for the UE to support DMRS bundling, a second indication, from the base station, to support DMRS bundling, or a third indication within the set of multiple communications.

Some aspects described herein relate to a non-transitory computer-readable medium that stores a set of instructions for wireless communication by a base station. The set of instructions, when executed by one or more processors of the base station, may cause the base station to receive, from a UE via a transmission channel, a set of multiple commu-nications. The set of instructions, when executed by one or more processors of the base station, may cause the base station to apply DMRS bundling across the set of multiple communications based at least in part on an indication within the set of multiple communications.

Some aspects described herein relate to an apparatus for wireless communication. The apparatus may include means for configuring one or more transmission parameters to maintain a channel consistency for a transmission channel. The apparatus may include means for transmitting, via the transmission channel, a set of multiple communications using the one or more transmission parameters.

Some aspects described herein relate to an apparatus for wireless communication. The apparatus may include means for performing one or more procedures that support DMRS bundling by a base station. The apparatus may include means for transmitting set of multiple communications based at least in part on the one or more procedures.

Some aspects described herein relate to an apparatus for wireless communication. The apparatus may include means for configuring one or more transmission parameters to maintain a channel consistency for a transmission channel. The apparatus may include means for transmitting an indication, within a set of multiple communications, indicating application of the one or more transmission parameters associated with maintenance of the channel consistency for the set of multiple communications.

Some aspects described herein relate to an apparatus for wireless communication. The apparatus may include means for performing one or more procedures that support DMRS bundling by a base station. The apparatus may include means for transmitting an indication, within a set of multiple communications, indicating performance of the one or more procedures that support the DMRS bundling for the set of multiple communications.

Some aspects described herein relate to an apparatus for wireless communication. The apparatus may include means for receiving, from a UE via a transmission channel, a set of multiple communications. The apparatus may include means for applying DMRS bundling across the set of multiple communications based at least in part on an indication comprising one or more of: a first indication within a communication protocol for the UE to support DMRS bundling, a second indication, from the apparatus, to support DMRS bundling, or a third indication within the set of multiple communications.

Some aspects described herein relate to an apparatus for wireless communication. The apparatus may include means for receiving, from a UE via a transmission channel, a set of multiple communications. The apparatus may include means for applying DMRS bundling across the set of multiple communications based at least in part on an indication within the set of multiple communications.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-13 are diagrams illustrating example processes associated with support for demodulation reference signal bundling by a base station, in accordance with the present disclosure.

DETAILED DESCRIPTION

Figure 1:
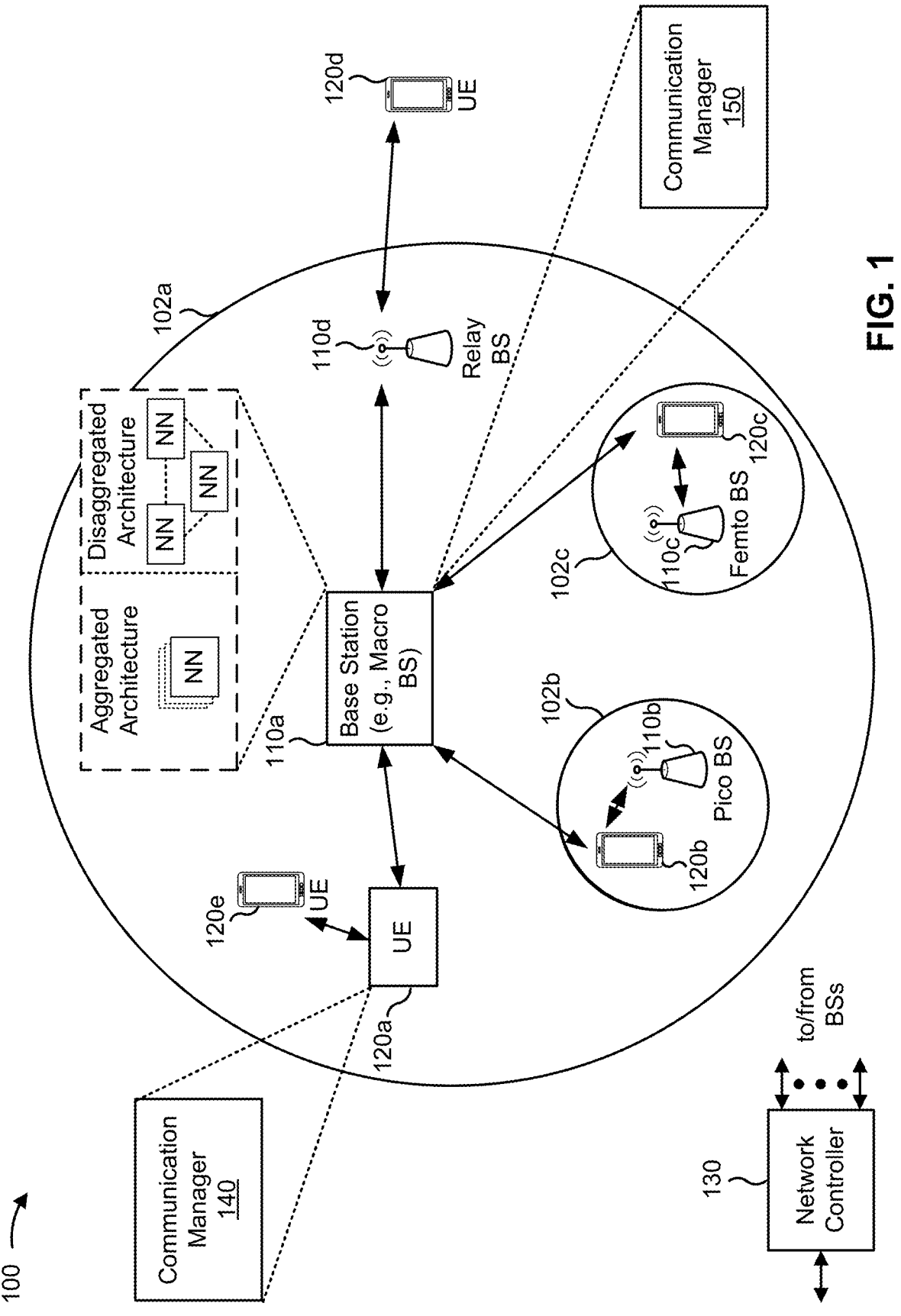
FIG. 1 is a diagram illustrating an example of a wireless network, in accordance with the present disclosure.

Demodulation reference signal (DMRS) bundling may be used to improve channel estimation by a receiving device. The receiving device may perform DMRS bundling by estimating a channel at times between DMRS symbols of different slots and/or communications (e.g., repetitions of a same message) and jointly processing received DMRS symbols across different slots and/or communications. The receiving device may apply the channel estimation to improve demodulation of data symbols and/or control symbols received between the DMRS symbols of the different slots and/or communications.

DMRS bundling may be ineffective if one or more transmission parameters are not met by a transmitting device. For example, if the transmitting device does not maintain phase continuity (e.g., using a same phase shift for a set of communications) and/or power consistency (e.g., using a same transmission power and/or power amplifier for the set of communications), channel estimation may be poor, decoding of the communications may fail, and the transmitting device and receiving device may consume computing, power, network, and/or communication resources based at least in part on failure of the communications. In some examples, the communications may be repetitions of an access channel message, such as a message 3 of a 4-step random access channel (RACH) procedure. In these examples, failure of the receiving device (e.g., a base station and/or a network node) to receive the message 3 may cause a failure of an attempt by the transmitting device (e.g., a user equipment (UE)) to connect to an associated network. In non-terrestrial networks (NTNs), the receiving device (e.g., a satellite associated with the base station and/or the network node) may be unable to receive the message 3 without bundling based at least in part on a pathloss associated with a transmission path length between the transmitting device and the receiving device.

In some aspects described herein, a UE may perform one or more procedures that support DMRS bundling at a base station and/or a network node. The UE may perform the one or more procedures based at least in part on an indication in a communication protocol (e.g., a standards specification for a radio access technology (RAT) used for communication between the UE and the base station and/or the network node) or an indication from the base station and/or the network node (e.g., a system information block (SIB)), among other examples. The UE may perform the one or more procedures (e.g., configuring one or more transmission parameters, maintaining phase continuity, and/or maintaining power consistency, among other examples) before and/or during transmission of one or more of a set of multiple communications (e.g., a set of repetitions of a same message).

In some aspects, the UE may perform the one or more procedures that support DMRS bundling, and the base station and/or the network node may perform DMRS bundling, without an indication from the UE that the UE performed the one or more procedures that support DMRS bundling when transmitting a set of multiple communications. For example, the base station and/or the network node may assume that the UE performed the one or more procedures that support DMRS bundling based at least in part on the indication in the communication protocol, the indication from the base station and/or the network node, and/or one or more other parameters. The one or more other parameters may include, for example, a UE power class, a frequency band used for the set of multiple communications, an orbit type (e.g., low-earth orbit, medium-earth orbit, or geostationary orbit, among other examples), and/or an orbit altitude, among other examples.

In some aspects, the UE may perform the one or more procedures that support DMRS bundling, and the base station and/or the network node may perform DMRS bundling, based at least in part on an indication within the set of multiple communications that the UE performed the one or more procedures that support DMRS bundling when transmitting the set of multiple communications. In some aspects, the UE may provide the indication based at least in part on using a field (e.g., a single bit field) that is multiplexed with (e.g., piggybacked to) the set of multiple communications. In some aspects, the UE may provide the indication implicitly based at least in part on selection of one or more transmission parameters. For example, the UE may selectively alternate between DMRS ports during transmission of the set of multiple communications or transmit all of the set of multiple communications using a single DMRS port to indicate whether the UE performed the one or more procedures that support DMRS bundling. The base station and/or the network node may detect whether the UE alternated between DMRS ports during transmission of the set of multiple communications by correlating respective DMRS sequences associated with the DMRS ports with the received signals on DMRS tones (e.g., subcarriers that carry the DMRSs). The base station and/or the network node may further use a probability analysis to determine whether DMRS port alternating was used or if the UE used a single DMRS port for the set of multiple transmissions.

The base station and/or the network node, and the UE, may be synchronized regarding whether the UE supports DMRS bundling by the base station and/or the network node for receiving the set of multiple communications. Based at least in part on synchronizing regarding support for DMRS bundling, the base station and/or the network node, and the UE, may conserve communication and/or network resources that may have otherwise been used to transmit an indication that the UE transmitted the set of multiple communications with support for DMRS bundling. Additionally, or alternatively, the base station and/or the network node may be able to use DMRS bundling when transmission of the indication is unavailable before transmission of the set of multiple communications (e.g., in a RACH procedure). Based at least in part on being able to use DMRS bundling, the base station and/or the network node may improve estimation of a channel used to transmit the set of multiple communications, which may in turn improve decoding of the set of multiple communications.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR RAT, aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS)

is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. In some networks, the base station 110a may include a wireless communication device (e.g., network node) in an aggregated structure (e.g., as described herein). In some aspects, the base station 110a may include a wireless communication device in a disaggregated structure (e.g., with multiple network nodes collectively providing a cell of the network). For example, the network node may include one or more of a central unit (CU), a distributed unit (DU), and/or a radio unit (RU) that provide a cell of the network (e.g., with a division of processing responsibilities for communications with the UEs of the cell). The terms "network node," "eNB," "base station," "NR base station," "gNB," "TRP," "AP," "node B," "5G NB," and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may configure one or more transmission parameters to maintain a channel consistency for a transmission channel; and transmit, via the transmission channel, a set of multiple communications using the one or more transmission parameters. Additionally, or alternatively, the communication manager 140 may perform one or more other operations described herein.

In some aspects, the UE 120 may include a communication manager 140. As described in more detail elsewhere herein, the communication manager 140 may perform one or more procedures that support DMRS bundling by a base station; and transmit set of multiple communications based at least in part on the one or more procedures. Additionally, or alternatively, the communication manager 140 may perform one or more other operations described herein.

In some aspects, the UE 120 may include a communication manager 140. As described in more detail elsewhere herein, the communication manager 140 may configure one or more transmission parameters to maintain a channel consistency for a transmission channel; and transmit an indication, within a set of multiple communications, indicating application of the one or more transmission parameters associated with maintenance of the channel consistency for the set of multiple communications. Additionally, or alternatively, the communication manager 140 may perform one or more other operations described herein.

In some aspects, the UE 120 may include a communication manager 140. As described in more detail elsewhere herein, the communication manager 140 may perform one or more procedures that support DMRS bundling by a base station; and transmit an indication, within a set of multiple communications, indicating performance of the one or more procedures that support the DMRS bundling for the set of multiple communications. Additionally, or alternatively, the communication manager 140 may perform one or more other operations described herein.

In some aspects, the base station 110 may include a communication manager 150. As described in more detail elsewhere herein, the communication manager 150 may receive, from a UE via a transmission channel, a set of multiple communications; and apply DMRS bundling across the set of multiple communications based at least in part on an indication comprising one or more of: a first indication within a communication protocol for the UE to support DMRS bundling, a second indication, from the base station, to support DMRS bundling, or a third indication within the set of multiple communications. Additionally, or alternatively, the communication manager 150 may perform one or more other operations described herein.

In some aspects, the base station 110 may include a communication manager 150. As described in more detail elsewhere herein, the communication manager 150 may receive, from a UE via a transmission channel, a set of multiple communications; and apply DMRS bundling across the set of multiple communications based at least in part on an indication within the set of multiple communications. Additionally, or alternatively, the communication manager 150 may perform one or more other operations described herein.

As indicated above, FIG. 1 is provided merely as an example. Other examples may differ from what is described with regard to FIG. 1.

Figure 2:
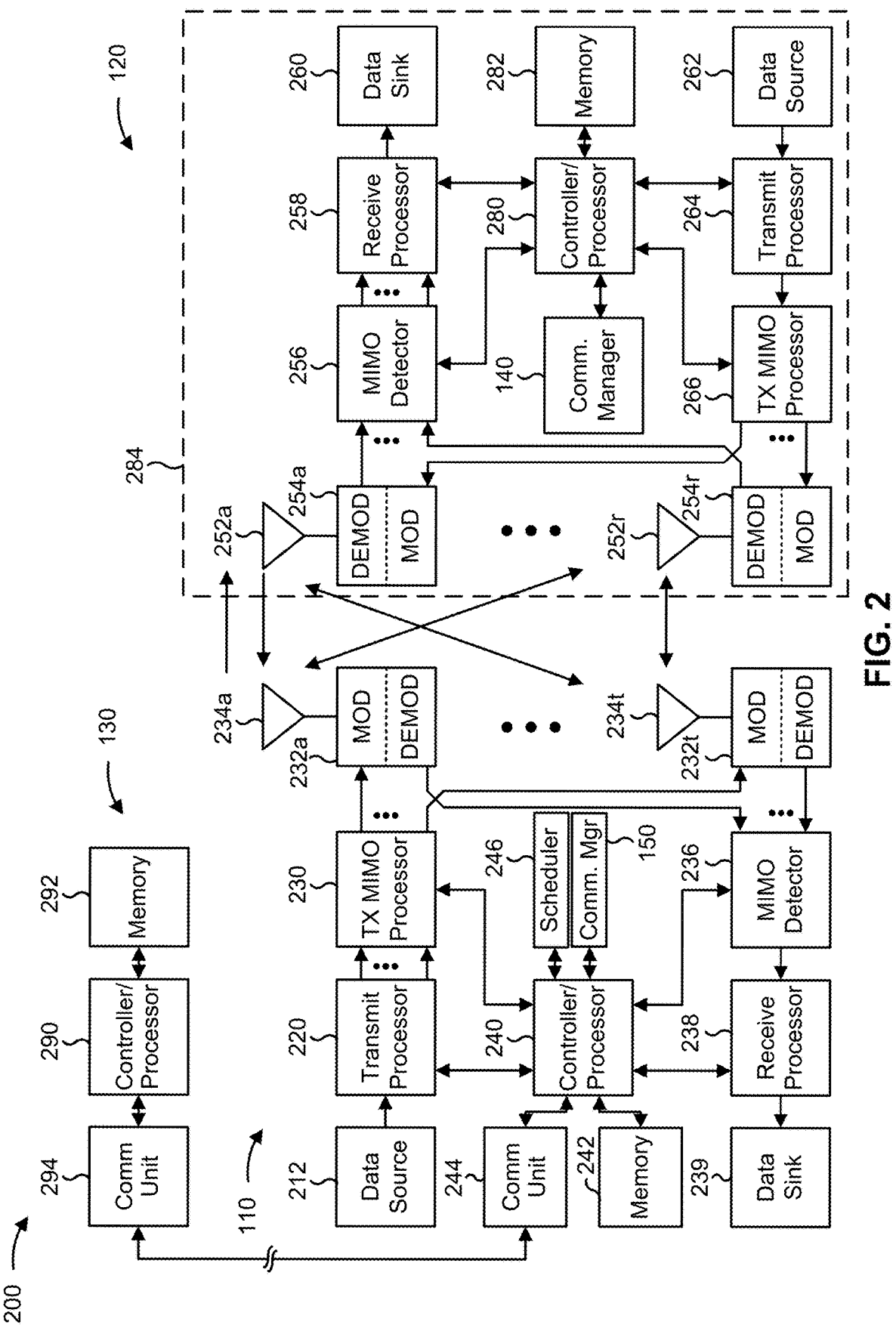
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding)

on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, the UE includes means for configuring one or more transmission parameters to maintain a channel consistency for a transmission channel; and/or means for transmitting, via the transmission channel, a set of multiple communications using the one or more transmission parameters. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for performing one or more procedures that support DMRS bundling by a base station; and/or means for transmitting set of multiple communications based at least in part on the one or more procedures. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for configuring one or more transmission parameters to maintain a channel consistency for a transmission channel; and/or means for transmitting an indication, within a set of multiple communications, indicating application of the one or more transmission parameters associated with maintenance of the channel consistency for the set of multiple communications. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for performing one or more procedures that support DMRS bundling by a base station; and/or means for transmitting an indication, within a set of multiple communications, indicating performance of the one or more procedures that support the DMRS bundling for the set of multiple communications. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving, from a UE via a transmission channel, a set of multiple communications; and/or means for applying DMRS bundling across the set of multiple communications based at least in part on an indication comprising one or more of: a first indication within a communication protocol for the UE to support DMRS bundling, a second indication, from the base station, to support DMRS bundling, or a third indication within the set of multiple communications. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station includes means for receiving, from a UE via a transmission channel, a set of multiple communications; and/or means for applying DMRS bundling across the set of multiple communications based at least in part on an indication within the set of multiple communications. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more centralized units (CUs), one or more distributed units (DUs), one or more radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figures 3A, 3B:
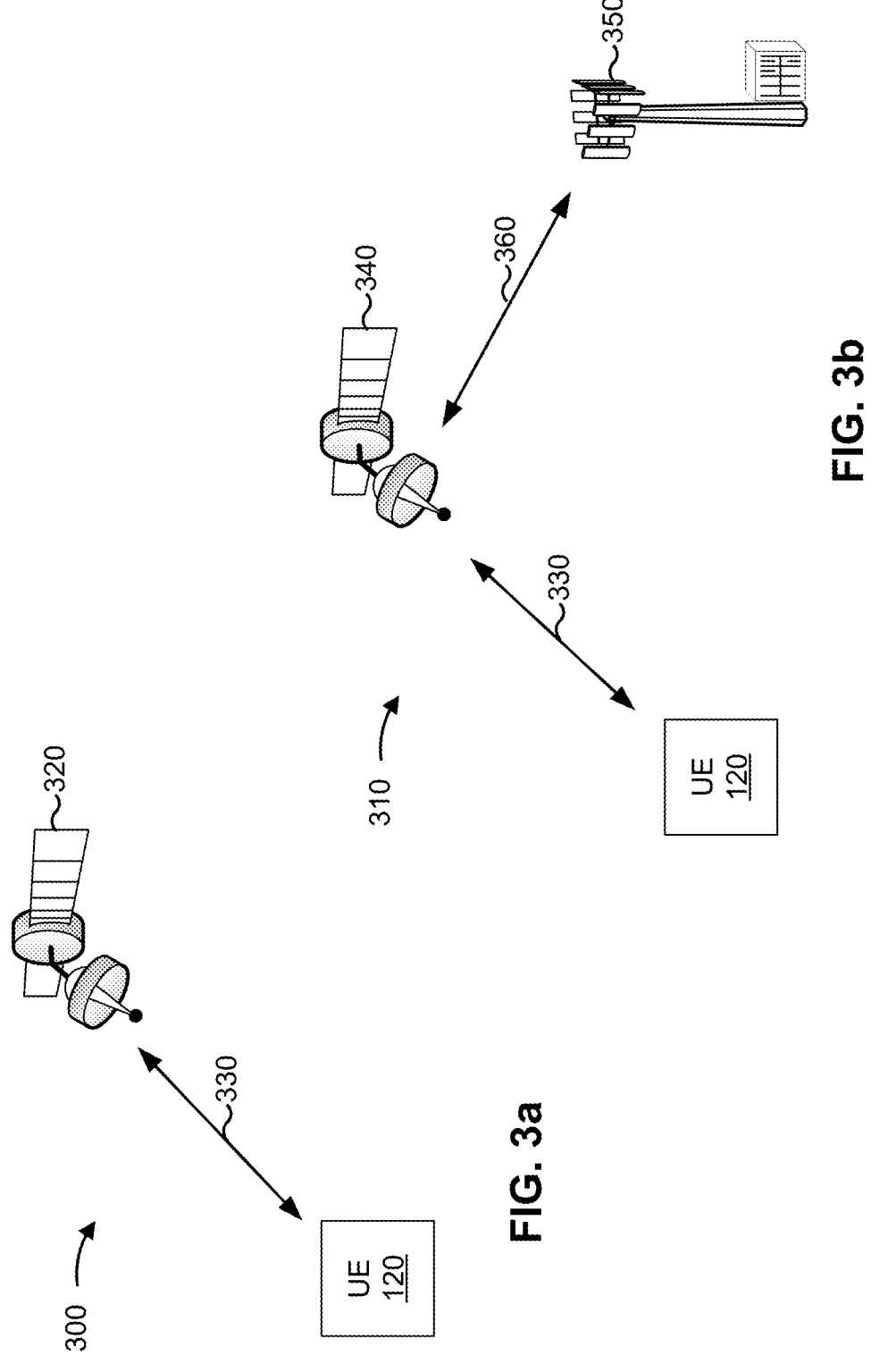
FIGS. 3a and 3b are diagrams illustrating an example of a regenerative satellite deployment and an example of a transparent satellite deployment in a non-terrestrial network, in accordance with the present disclosure.

FIGS. 3a and 3b are diagrams illustrating an example 300 of a regenerative satellite deployment and an example 310 of a transparent satellite deployment in an NTN.

Example 300 shows a regenerative satellite deployment. In example 300, a UE 120 is served by a satellite 320 via a service link 330. For example, the satellite 320 may include a BS 110 (e.g., BS 110*a*) or a gNB. In some aspects, the satellite 320 may be referred to as a non-terrestrial base station, a regenerative repeater, or an on-board processing repeater. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from base station 350 (e.g., a gateway) via a feeder link 360. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability or a Global Positioning System (GPS) capability, though not all UEs have such capabilities. The satellite 340 may provide a cell that covers the UE 120.

The service link 330 may include a link between the satellite 340 and the UE 120, and may include one or more of an uplink or a downlink. The feeder link 360 may include a link between the satellite 340 and the base station 350, and may include one or more of an uplink (e.g., from the UE 120 to the base station 350) or a downlink (e.g., from the base station 350 to the UE 120). An uplink of the service link 330 may be indicated by reference number 330-U (not shown in FIGS. 3*a* and 3*b*) and a downlink of the service link 330 may be indicated by reference number 330-D (not shown in FIGS. 3*a* and 3*b*). Similarly, an uplink of the feeder link 360 may be indicated by reference number 360-U (not shown in FIGS. 3*a* and 3*b*) and a downlink of the feeder link 360 may be indicated by reference number 360-D (not shown in FIGS. 3*a* and 3*b*).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but Doppler effect may still be associated with some amount of uncompensated frequency error. Furthermore, the base station 350 may be associated with a residual frequency error, and/or the satellite 320/340 may be associated with an on-board frequency error. These sources of frequency error may cause a received downlink frequency at the UE 120 to drift from a target downlink frequency.

In some NTNs, a path length of the service link 330 may cause an increased pathloss when compared with terrestrial networks. To compensate for the pathloss, the UE 120 may use repetitions when transmitting uplink communications. To reduce a number of DMRS symbols needed in the repetitions, DMRS bundling may be useful. However, DMRS bundling may be ineffective if the UE 120 does not maintain channel consistency to support DMRS bundling. In some cases, the UE 120 may consume network and/or communication resources to indicate whether the UE will maintain channel consistency and/or that the UE 120 will support DMRS bundling in transmitting a set of multiple communications. In some cases, the UE 120 may not have an opportunity to indicate whether the UE 120 will maintain channel consistency and/or support DMRS bundling (e.g., for a message of a RACH procedure, among other examples). In these cases, the base station 350, the satellite 320, and/or the satellite 340 may not perform DMRS bundling to avoid errors caused by channel inconsistency, which may degrade demodulation of the set of multiple communications. Alternatively, the base station 350, the satellite 320, and/or the satellite 340 may consume computing and power resources to attempt a first hypothesis that the UE 120 did maintain channel consistency and attempt a second hypothesis that the UE 120 did not maintain channel consistency when attempting to estimate a channel and/or demodulate the set of multiple communications.

As indicated above, FIGS. 3*a* and 3*b* are provided as an example. Other examples may differ from what is described with regard to FIGS. 3*a* and 3*b*.

Figure 4:
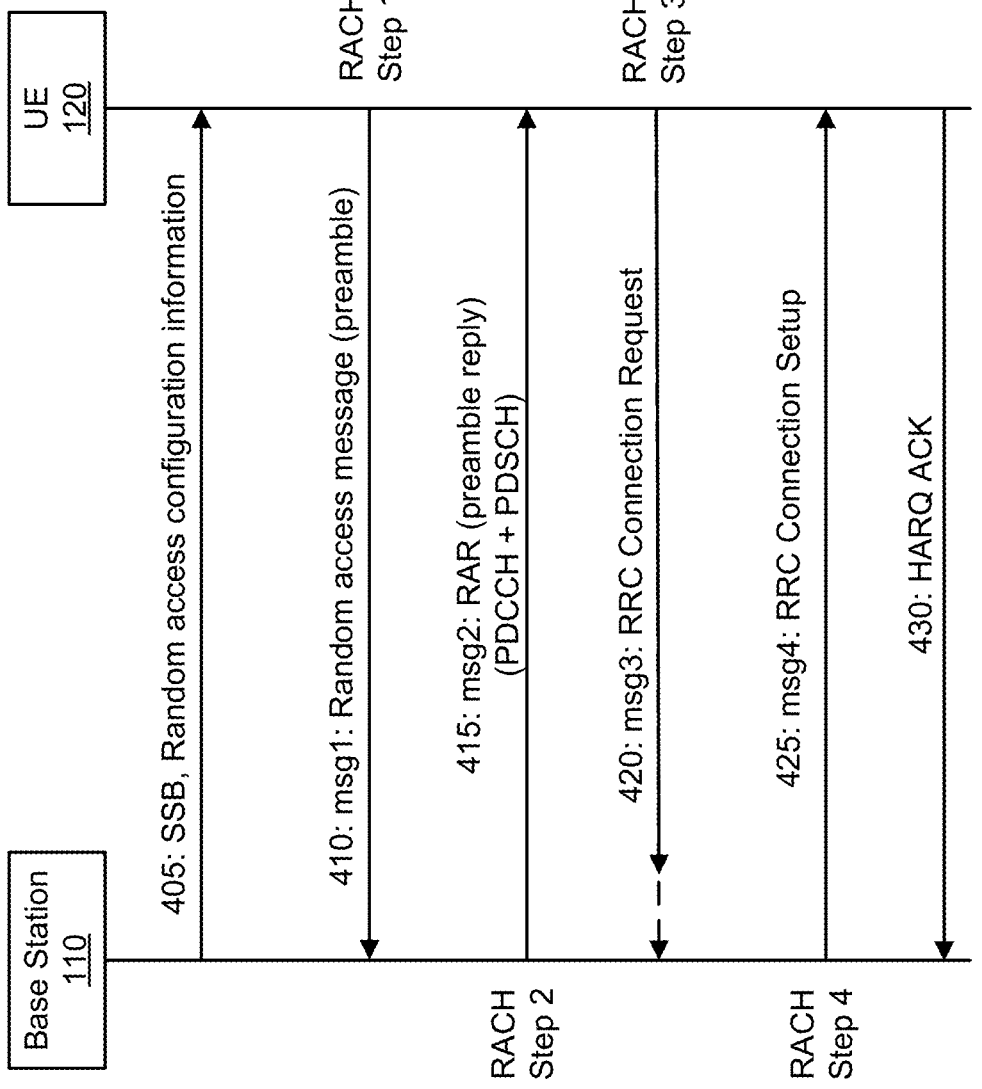
FIG. 4 is a diagram illustrating an example of a four-step random access procedure, in accordance with the present disclosure.

FIG. 4 is a diagram illustrating an example 400 of a four-step random access procedure, in accordance with the present disclosure. As shown in FIG. 4, a base station 110 and a UE 120 may communicate with one another to perform the four-step random access procedure.

As shown by reference number 405, the base station 110 may transmit, and the UE 120 may receive, one or more synchronization signal blocks (SSBs) and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a RAM and/or one or more parameters for receiving a random access response (RAR).

As shown by reference number 410, the UE 120 may transmit a RAM, which may include a preamble (sometimes referred to as a random access preamble, a physical random access channel (PRACH) preamble, or a RAM preamble). The message that includes the preamble may be referred to as a message 1, msg1, MSG1, a first message, or an initial message in a four-step random access procedure. The random access message may include a random access preamble identifier.

As shown by reference number 415, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second RACH step of the four-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second RACH step of the four-step random access procedure, the base station 110 may transmit the PDSCH communication for the RAR, as scheduled by the PDCCH communication. The RAR may be included in a MAC protocol data unit (PDU) of the PDSCH communication. The RAR may include a resource allocation (e.g., grant) for message 3, msg3, MSG3, a third message of a four-step random access procedure.

As shown by reference number 420, the UE 120 may transmit an RRC connection request message. The RRC connection request message may be referred to as message 3, msg3, MSG3, or a third message of a four-step random access procedure. In some aspects, the RRC connection request may include a UE identifier, uplink control information (UCI), and/or a physical uplink shared channel (PUSCH) communication (e.g., an RRC connection request). In some transmissions of the message 3 (e.g., for a RACH associated with an NTN), the base station 110 may be unable to receive the message based at least in part on a pathloss associated with a transmission path length between the transmitting device and the receiving device.

As shown by reference number 425, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 430, if the UE 120 successfully receives the RRC connection setup message, the UE 120 may transmit a hybrid automatic repeat request (HARD) acknowledgment (ACK).

In some networks, the UE 120 may fail to connect to the base station based at least in part on failure of the MSG3 described in connection with reference number 420. For this reason, the UE 120 may transmit the MSG3 using repetitions and/or the base station may attempt to use DMRS bundling to receive the MSG3 to reduce a likelihood of failure of the MSG3.

As indicated above, FIG. 4 is provided as an example. Other examples may differ from what is described with regard to FIG. 4.

DMRS bundling may be used to improve channel estimation by a receiving device. DMRS bundling includes estimating a channel at times between DMRS symbols of different slots and/or communications (e.g., repetitions of a same message). The receiving device may apply the channel estimation to improve demodulation of data symbols and/or control symbols received between the DMRS symbols of the different slots and/or communications.

DMRS bundling may be ineffective if one or more transmission parameters are not met by a transmitting device. For example, if the transmitting device does not maintain phase continuity and/or power consistency, channel estimation may be poor, decoding of the communications may fail, and the transmitting device and receiving device may consume computing, power, network, and/or communication resources based at least in part on failure of the communications. In some examples, the communications may be repetitions of an access channel message, such as a message 3 of a 4-step RACH procedure. In these examples, failure of the receiving device (e.g., a base station) to receive the message 3 may cause a failure of an attempt by the transmitting device (e.g., a UE) to connect to an associated network. In NTNs, the receiving device (e.g., a satellite associated with the base station) may be unable to decode the message 3 without DMRS bundling based at least in part on a pathloss associated with a transmission path length between the transmitting device and the receiving device.

In some aspects described herein, a UE may perform one or more procedures that support DMRS bundling at a base station. The UE may perform the one or more procedures based at least in part on one or more parameters in a communication protocol (e.g., a communication standard, a standards specification for a RAT used for communication between the UE and the base station) or an indication from the base station (e.g., an SIB), among other examples. The UE may perform the one or more procedures (e.g., configuring one or more transmission parameters, maintaining phase continuity, and/or maintaining power consistency, among other example) before and/or during transmission of one or more of a set of multiple communications (e.g., a set of repetitions of a same message).

In some aspects, the UE may perform the one or more procedures that support DMRS bundling, and the base station may perform DMRS bundling, without an indication from the UE that the UE performed the one or more procedures that support DMRS bundling when transmitting a set of multiple communications. For example, the base station may assume that the UE performed the one or more procedures that support DMRS bundling based at least in part on the one or more parameters in the communication protocol, the indication from the base station, and/or one or more other parameters. The one or more other parameters may include, for example, a UE power class, a frequency band used for the set of multiple communications, an orbit type (e.g., low-earth orbit, medium-earth orbit, or geostationary orbit, among other examples), and/or an orbit altitude, among other examples.

In some aspects, the UE may perform the one or more procedures that support DMRS bundling, and the base station may perform DMRS bundling, based at least in part on an indication within the set of multiple communications that the UE performed the one or more procedures that support DMRS bundling when transmitting the set of multiple communications. In some aspects, the UE may provide the indication based at least in part on using a field (e.g., a single bit field) that is multiplexed with (e.g., piggybacked to) the set of multiple communications. In some aspects, the UE may provide the indication implicitly based at least in part on selection of one or more transmission parameters. For example, the UE may selectively alternate between DMRS ports during transmission of the set of multiple communications or transmit all of the set of multiple communications using a single DMRS port to indicate whether the UE performed the one or more procedures that support DMRS bundling. The base station may detect whether the UE alternated between DMRS ports during transmission of the set of multiple communications by correlating respective DMRS sequences associated with the DMRS ports with the received signals on DMRS tones. The base station may further use a probability analysis to determine whether DMRS port alternating was used or if the UE used a single DMRS port for the set of multiple transmissions.

In this way, the base station and the UE may be synchronized regarding whether the UE supports DMRS bundling by the base station for receiving the set of multiple communications. This may conserve communication and/or network resources that may have otherwise been used to transmit an indication that the UE transmitted the set of multiple communications with support for DMRS bundling and/or the base station may be able to use DMRS bundling when transmission of the indication is unavailable before transmission of the set of multiple communications (e.g., in a RACH procedure).

Figure 5:
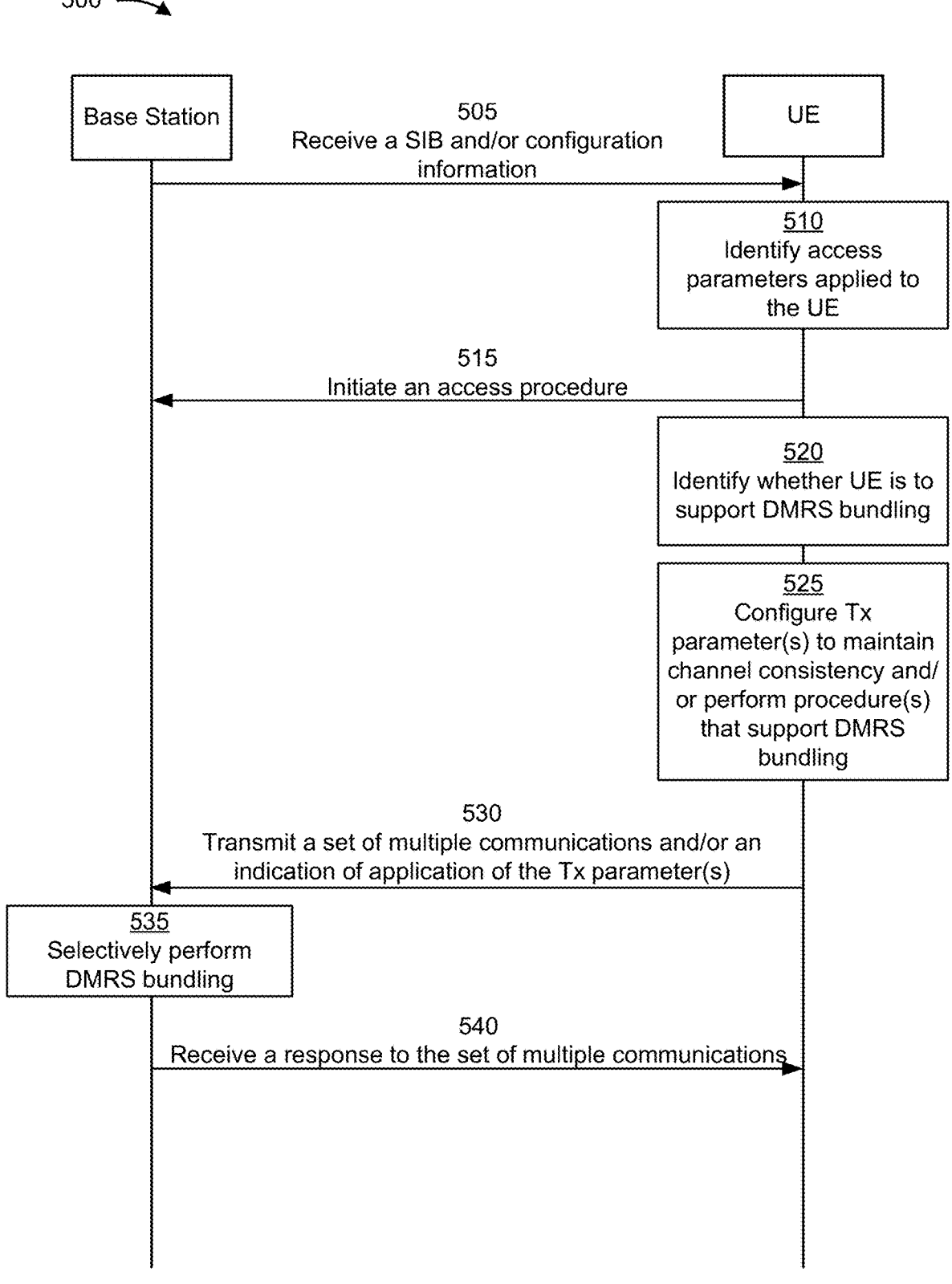
FIGS. 5-7 are diagrams illustrating examples associated with support for demodulation reference signal bundling by a base station, in accordance with the present disclosure.

FIG. 5 is a diagram illustrating an example 500 associated with support for demodulation reference signal bundling by a base station, in accordance with the present disclosure. As shown in FIG. 5, a base station (e.g., base station 110) may communicate with a UE (e.g., UE 120). In some aspects, the base station and the UE may be part of a wireless network (e.g., wireless network 100), such as an NTN network. The UE and the base station may have established a wireless connection prior to operations shown in FIG. 5. The base station and the UE may be associated with one or more satellites through which the base station and the UE may communicate. In some aspects, the base station may include, or be included in, a satellite.

As shown by reference number 505, the base station may transmit, and the UE may receive, an SIB and/or configuration information. In some aspects, the UE may receive the SIB via a broadcast communication from the base station (e.g., before establishing the wireless connection). In some aspects, the UE may receive the configuration information via one or more of RRC signaling, one or more MAC CEs, and/or downlink control information (DCI), among other examples. In some aspects, the configuration information may include an indication of one or more configuration parameters (e.g., already known to the UE) for selection by the UE, or explicit configuration information for the UE to use to configure the UE, among other examples. In some aspects, the UE may receive only the SIB and not configuration information before performing at least one of the following operations. For example, the UE may receive the SIB and then perform one or more of the following operations to attempt to establish a connection through which the UE may receive configuration information.

In some aspects, the SIB and/or the configuration information may indicate that the UE is to maintain the channel consistency for the transmission channel and/or perform one or more procedures that support DMRS bundling by the base station. In some aspects, the SIB and/or the configuration information may indicate that the UE is required to maintain the channel consistency for the transmission channel and/or perform one or more procedures that support DMRS bundling by the base station for the UE to be permitted to connect to the base station. In some aspects, the UE may be permitted to initiate a RACH procedure only if the UE is capable of maintaining the channel consistency for the transmission channel and/or performing one or more procedures that support DMRS bundling by the base station.

In some aspects, the SIB and/or the configuration information may indicate parameters that indicate whether the UE is to maintain the channel consistency for the transmission channel and/or perform one or more procedures that support DMRS bundling by the base station. For example, the SIB and/or the configuration information may indicate that the UE is to maintain the channel consistency for the transmission channel and/or perform one or more procedures that support DMRS bundling by the base station based at least in part on a power class of the UE (e.g., if a power class of the UE is indicated before transmission of a set of multiple communications), a time associated with transmitting one or more communications of the set of multiple communications, or an elevation angle of a beam associated with transmitting one or more communications of the set of multiple communications, among other examples.

In some aspects, the SIB and/or the configuration information may indicate that the UE is to maintain the channel consistency for the transmission channel and/or perform one or more procedures that support DMRS bundling by the base station based at least in part on an one or more parameters within a communication protocol, a frequency band of the transmission channel, an orbit type of a satellite associated with the set of multiple communications, and/or an orbit altitude of the satellite associated with the set of multiple communications, among other examples. For example, the SIB and/or the configuration information may indicate that the UE is to maintain the channel consistency for the transmission channel and/or perform one or more procedures that support DMRS bundling by the base station when an elevation angle of a beam center of a beam used for the transmission channel satisfies a threshold (e.g., less than a threshold angle). In this way, the UE may be indicated to maintain the channel consistency for the transmission channel and/or perform one or more procedures that support DMRS bundling by the base station at a first period of time and not at a second period of time.

The UE may configure itself based at least in part on the configuration information. In some aspects, the UE may be configured to perform one or more operations described herein based at least in part on the configuration information.

As shown by reference number 510, the UE may identify access parameters that are applied to the UE. For example, the UE may identify access parameters associated with whether the UE is required, to be permitted to access a network via the base station, to maintain the channel consistency for the transmission channel and/or perform one or more procedures that support DMRS bundling by the base station. In some aspects, the UE may determine whether the UE is required to maintain the channel consistency for the transmission channel and/or perform one or more procedures that support DMRS bundling by the base station based at least in part on the SIB or a communication protocol (e.g., a specification standard). Based at least in part on the access parameters that are applied to the UE, the UE may determine whether or not to initiate an access procedure with the base station.

In some aspects, the UE may identify the access parameters based at least in part on a power class of the UE, a time associated with transmitting one or more communications of the set of multiple communications, an elevation angle of a beam associated with transmitting one or more communications of the set of multiple communications, a frequency band of the transmission channel, an orbit type of a satellite associated with the set of multiple communications, and/or an orbit altitude of the satellite associated with the set of multiple communications, among other examples As shown by reference number 515, the UE may initiate an access procedure. For example, the UE may transmit a MSG 1 of a RACH procedure. In some aspects, the UE may initiate the access procedure based at least in part on a UE capability to configure the one or more transmission parameters to maintain the channel consistency for the transmission channel and/or to perform the one or more procedures that support DMRS bundling by the base station.

As shown by reference number 520, the UE may identify whether the UE is to support DMRS bundling. In some aspects, the UE may identify whether the UE is to support DMRS bundling based at least in part on the SIB or a communication protocol. In some aspects, the UE may identify (e.g., based at least in part on the SIB or the communication protocol) whether the UE is to support DMRS bundling based at least in part on a power class of the UE, a time associated with transmitting one or more communications of the set of multiple communications, an elevation angle of a beam associated with transmitting one or more communications of the set of multiple communications, a frequency band of the transmission channel, an orbit type of a satellite associated with the set of multiple communications, and/or an orbit altitude of the satellite associated with the set of multiple communications, among other examples.

In some aspects, the supporting DMRS bundling includes maintaining channel consistency for the transmission channel and/or performing one or more procedures that support DMRS bundling by the base station. For example, the UE may support DMRS bundling based at least in part on maintaining phase continuity and power consistency for transmitting the set of multiple communications. In some aspects, the UE may perform the one or more procedures that support DMRS bundling by the base station based at least in part on performing the one or more procedures during transmissions of the set of multiple communications (e.g., repetitions of a same communication, such as a MSG3 of a RACH procedure).

As shown by reference number 525, the UE may configure one or more transmission parameters to maintain channel consistency and/or perform one or more procedures that support DMRS bundling. In some aspects, performing the one or more procedures that support DMRS bundling may include configuring the one or more transmission parameters to maintain channel consistency. In some aspects, configuring the one or more transmission parameters to maintain the channel consistency for the transmission channel and/or performing one or more procedures that support DMRS bundling includes maintaining phase continuity for the set of multiple communications and/or maintaining power consistency for the set of multiple communications. For example, the UE may use a same transmission power for transmitting all of the communications within the set of multiple configures to support DMRS bundling by the base station.

In some aspects, the UE may configure one or more transmission parameters to maintain channel consistency and/or perform one or more procedures that support DMRS bundling based at least in part on the one or more parameters within the communication protocol and/or the indication within the SIB (e.g., to maintain channel consistency for the transmission channel and/or to perform one or more procedures that support DMRS bundling). In some aspects, the UE may configure one or more transmission parameters to maintain channel consistency and/or perform one or more procedures that support DMRS bundling based at least in part on (e.g., in addition to or in the alternative of the indication with the communication protocol and/or the indication within the SIB) a power class of the UE, a frequency band of the transmission channel, an orbit type of a satellite associated with the set of multiple communications, and/or an orbit altitude of the satellite associated with the set of multiple communications, among other examples.

As shown by reference number 530, the UE may transmit, and the base station may receive, a set of multiple communications and/or an indication of application of the one or more transmission parameters (e.g., parameters associated with maintenance of the channel consistency for the set of multiple communications and/or support for DMRS bundling by the base station). In some aspects, the UE may performing the one or more procedures that support DMRS bundling by the base station during transmissions of the set of multiple communications.

In some aspects, the set of multiple communications include repetitions of a same message. For example, the set of multiple communications may include repetitions of a RACH message (e.g., MSG 1 or MSG 3). For example, the set of multiple communications may include repetitions of message A, or MsgA, a first message of a 2-step RACH procedure.

In some aspects, the transmission channel used to transmit the set of multiple communications is associated with an NTN network. For example, the transmission channel may connect the UE to a satellite that comprises, or is comprised in, the base station. Alternatively, the transmission channel may connect the UE to a satellite that is connected to the base station (e.g., another satellite or a terrestrial base station).

In some aspects, the UE may transmit the indication of application of the transmission parameters and/or support for DMRS bundling at the base station within a bitfield (e.g., a single bit indicator or multi-bit indicator) that is multiplexed with a RACH communication. Alternatively, the UE may transmit the indication implicitly. For example, the UE may indicate application of the transmission parameters and/or support for DMRS bundling at the base station based at least in part on whether the UE alternates DMRS ports during transmission of the set of multiple communications, among other examples.

As shown by reference number 535, the base station may selectively perform DMRS bundling. For example, the base station may perform DMRS bundling based at least in part on an one or more parameters within a communication protocol for the UE to support DMRS bundling, a, indication from the base station for the UE to support DMRS bundling (e.g., via the SIB), and/or an indication within the set of multiple communications that the UE supported DMRS bundling, among other examples. In some aspects, the base station may identify an explicit indication within the set of multiple communications (e.g., an indication within a bitfield multiplexed with the set of multiple communications). Alternatively, the base station may identify an implicit indication within the set of multiple communications. For example, the base station may determine if the UE alternated DMRS ports used to transmit the set of multiple communications. The base station may detect whether a DMRS port 0 or a DMRS port 1 is used for a communication of the set of multiple communications by correlating respective DMRS sequences associated with the DMRS ports with a received signal on DMRS tones and identify which DMRS sequence (e.g., alternating DMRS ports or using a single DMRS port) is more probable.

As shown by reference number 540, the UE may receive, and the base station may transmit, a response to the set of multiple communications. For example, the base station may transmit a MSG 4 of a RACH procedure and/or HARQ feedback.

Based at least in part on the operations described in connection with FIG. 5, the base station and the UE may be synchronized regarding whether the UE supports DMRS bundling by the base station for receiving the set of multiple communications. This may conserve communication and/or network resources that may have otherwise been used to transmit an indication that the UE transmitted the set of multiple communications with support for DMRS bundling and/or the base station may be able to use DMRS bundling when transmission of the indication is unavailable before transmission of the set of multiple communications (e.g., in a RACH procedure).

As indicated above, FIG. 5 is provided as an example. Other examples may differ from what is described with regard to FIG. 5.

Figure 6:
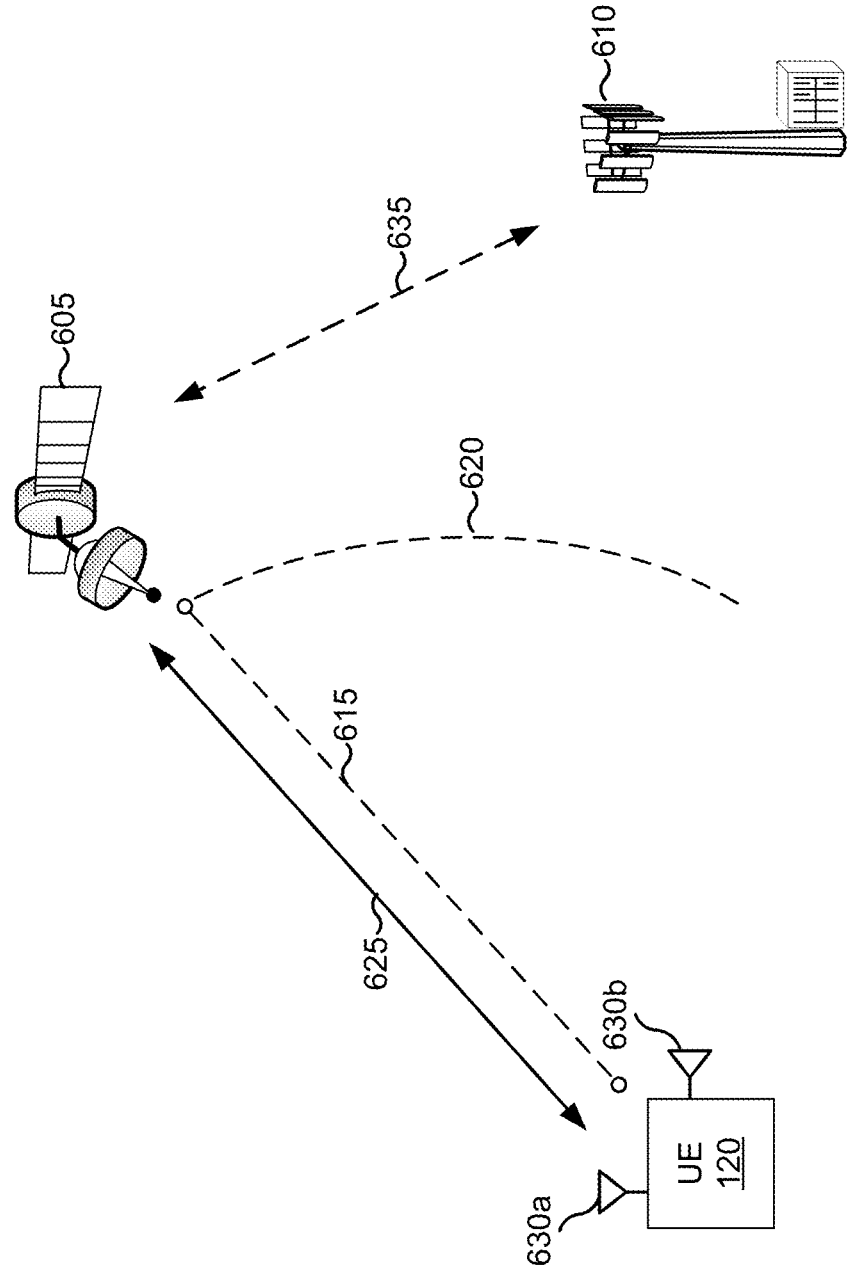

FIG. 6 is a diagram illustrating an example 600 associated with support for demodulation reference signal bundling by a base station, in accordance with the present disclosure. As shown in FIG. 6, a satellite 605 (e.g., a base station 110 or a link to a base station 110) and/or a base station 610 (e.g., base station 110) may communicate with a UE 120. In some aspects, the satellite 605 may provide a relay and/or forwarding for communication with the base station 610. In some aspects, the satellite 605 may include a base station (e.g., base station 110 and/or base station 610). The satellite 605 and/or the base station 610 may be part of a wireless network (e.g., wireless network 100), such as an NTN network to which the UE is connected or is attempting to connect. Although example 600 shows the satellite 605, other examples may include an unmanned aerial vehicle or another relay and/or forwarding node that is in non-terrestrial.

The satellite 605 may have an orbital altitude 615 associated with a height of the satellite 605 above a surface of the Earth. In some aspects, the orbital altitude 615 may be associated with an orbit type (e.g., a range of orbital altitudes), such as low Earth orbit or geostationary orbit, among other examples. The satellite 605 may have an elevation angle 620 that indicates an angle of the satellite from a surface of the Earth at a location of the UE 120. For example, the elevation angle 620 may be relative to a tangential plane at the surface of the Earth at the location of the UE 120.

The UE 120 may be aware of a link 625 (e.g., service link 330) through which the UE 120 may communicate with and/or through the satellite 605. For example, the UE 120 may be aware of the link 625 based at least in part on reception of a SIB via the link 625 (e.g., or an associated broadcast). The UE 120 may be configured with multiple ports (port 630a and 630b) through which the UE 120 may communicate via the link 625. In some aspects, the port 630a and the port 630b may be DMRS ports that are virtual ports or physical ports. The UE 120 may communication via the link using one of the ports 630a or 630b, or may use both of the ports 630a and 630b in a pattern. For example, the UE 120 may use a pattern (e.g., an alternating pattern) using both of the ports 630a and 630b to indicate to the base station 610 and/or the satellite 605 whether the UE 120 used, or is using, one or more parameters to maintain a channel consistency for a transmission channel, and/or whether the UE 120 performed, or is performing, one or more procedures that support DMRS bundling by a base station (e.g., the satellite 605 or the base station 610).

The satellite 605 may relay the set of multiple communications, such as a RACH message with repetitions, received from the UE 120 to the base station 610 via a feeder link 635. In some aspects, the base station 610 may provide a response to the set of multiple communications to the satellite 605 for forwarding to the UE 120.

As indicated above, FIG. 6 is provided as an example. Other examples may differ from what is described with regard to FIG. 6.

Figure 7:
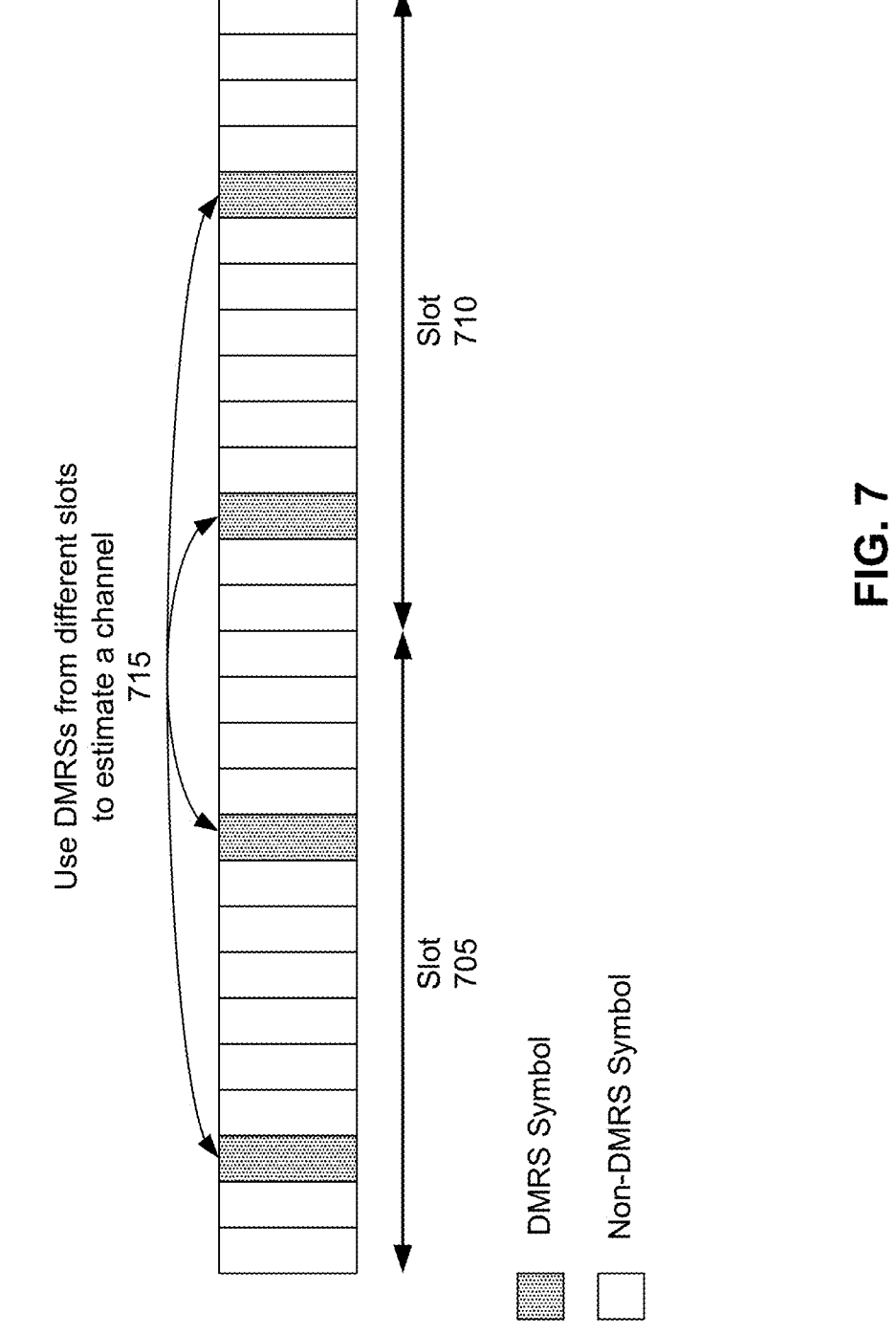

FIG. 7 is a diagram illustrating an example 700 associated with support for demodulation reference signal bundling by a base station, in accordance with the present disclosure. As shown in FIG. 7, a receiving device (e.g., base station 110) may communicate with a transmitting device (e.g., UE 120). In some aspects, the transmitting device and the receiving device may be part of a wireless network (e.g., wireless network 100), such as an NTN network. The transmitting device may be performing an access procedure to access the wireless network. The base station and the UE may be associated with one or more satellites through which the base station and the UE may communicate. In some aspects, the base station may include, or be included in, a satellite.

As shown in FIG. 7, the transmitting device may transmit a set of multiple communications using multiple slots (e.g., slot 705 and slot 710). In some aspects, the transmitting device may support DMRS bundling based at least in part on performing one or more operations described herein. Additionally, the receiving device may determine that DMRS bundling may be used to receive the set of multiple communications based at least in part on one or more operations described herein.

As by reference number 715, the receiving device may use DMRSs from different slots to estimate a channel 715. For example, the receiving device may perform DMRS bundling including estimating a channel for non-DMRS symbols at times that are between DMRS symbols of the slot 705 and DMRS symbols of the slot 710 by using DMRS symbols from both slots. Based at least in part on performing DMRS bundling, the receiving device may improve channel estimation based at least in part on using a nearest DMRS symbol before the non-DMRS symbols and a nearest DMRS symbol after the non-DMRS symbols instead of, for example, using only DMRS symbols within the slot 705 (e.g., only DMRS symbols before the non-DMRS symbols) or only DMRS symbols within the slot 710 (e.g., only DMRS symbols after the non-DMRS symbols). Additionally, or alternatively, the receiving device may perform DMRS bundling including jointly estimating a channel for non-DMRS symbols in slot 705 and slot 710 by using all DMRS symbols in both slots.

As indicated above, FIG. 7 is provided as an example. Other examples may differ from what is described with regard to FIG. 7.

Figure 8:
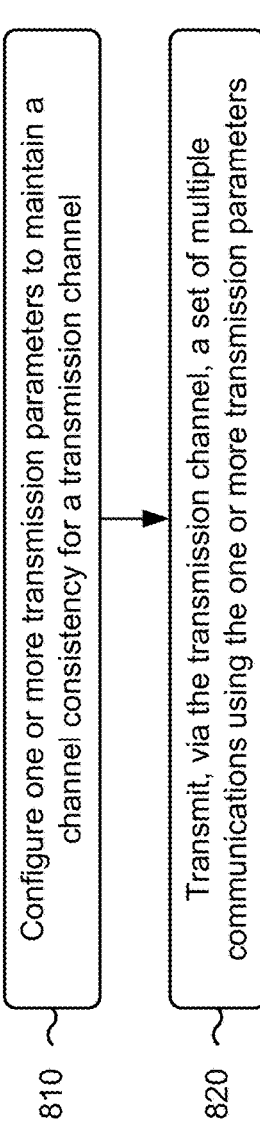

FIG. 8 is a diagram illustrating an example process 800 performed, for example, by a UE, in accordance with the present disclosure. Example process 800 is an example where the UE (e.g., UE 120) performs operations associated with support for DMRS bundling by a base station.

As shown in FIG. 8, in some aspects, process 800 may include configuring one or more transmission parameters to maintain a channel consistency for a transmission channel (block 810). For example, the UE (e.g., using communication manager 140 and/or transmission component 1404, depicted in FIG. 14) may configure one or more transmission parameters to maintain a channel consistency for a transmission channel, as described above.

As further shown in FIG. 8, in some aspects, process 800 may include transmitting, via the transmission channel, a set of multiple communications using the one or more transmission parameters (block 820). For example, the UE (e.g., using communication manager 140 and/or transmission component 1404, depicted in FIG. 14) may transmit, via the transmission channel, a set of multiple communications using the one or more transmission parameters, as described above.

Process 800 may include additional aspects, such as any single aspect or any combination of aspects described below and/or in connection with one or more other processes described elsewhere herein.

In a first aspect, configuring the one or more transmission parameters to maintain the channel consistency for the transmission channel comprises one or more of maintaining phase continuity for the set of multiple communications, or maintaining power consistency for the set of multiple communications.

In a second aspect, alone or in combination with the first aspect, the set of multiple communications comprise repetitions of a random access channel message.

In a third aspect, alone or in combination with one or more of the first and second aspects, the transmission channel is associated with a non-terrestrial network.

In a fourth aspect, alone or in combination with one or more of the first through third aspects, configuring the one or more transmission parameters to maintain the channel consistency for the transmission channel is based at least in part on a one or more of parameters, within a communication protocol, indicating to maintain the channel consistency for the transmission channel, a power class of the UE, a frequency band of the transmission channel, an orbit type of a satellite associated with the set of multiple communications, or an orbit altitude of the satellite associated with the set of multiple communications.

In a fifth aspect, alone or in combination with one or more of the first through fourth aspects, process 800 includes initiating, before transmitting one or more communications of the set of multiple communications, an access procedure based at least in part on a UE capability to configure the one or more transmission parameters to maintain the channel consistency for the transmission channel.

In a sixth aspect, alone or in combination with one or more of the first through fifth aspects, process 800 includes receiving an indication to maintain the channel consistency for the transmission channel.

In a seventh aspect, alone or in combination with one or more of the first through sixth aspects, receiving the indication to maintain the channel consistency for the transmission channel comprises receiving the indication via a system information block.

In an eighth aspect, alone or in combination with one or more of the first through seventh aspects, the indication to maintain the channel consistency for the transmission channel indicates that the UE is required to maintain the channel consistency for the transmission channel.

In a ninth aspect, alone or in combination with one or more of the first through eighth aspects, the UE is required to maintain the channel consistency for the transmission channel based at least in part on one or more of a power class of the UE, a time associated with transmitting one or more communications of the set of multiple communications, or an elevation angle of a beam associated with transmitting one or more communications of the set of multiple communications.

In a tenth aspect, alone or in combination with one or more of the first through ninth aspects, the UE is to maintain the channel consistency for the transmission channel based at least in part on one or more of a power class of the UE, a time associated with transmitting one or more communications of the set of multiple communications, or an elevation angle of a beam associated with transmitting one or more communications of the set of multiple communications.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
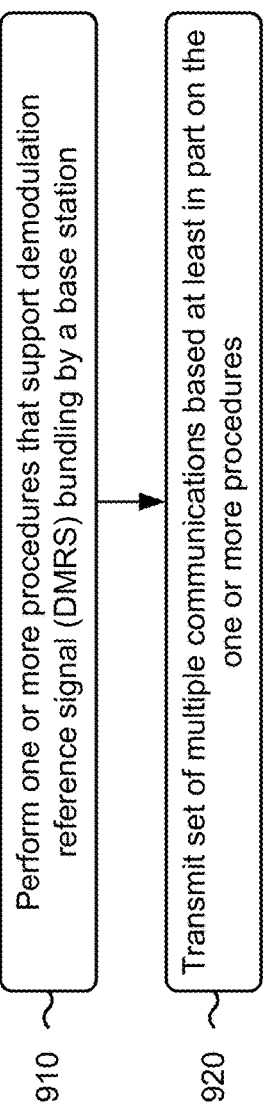

FIG. 9 is a diagram illustrating an example process 900 performed, for example, by a UE, in accordance with the present disclosure. Example process 900 is an example where the UE (e.g., UE 120) performs operations associated with support for DMRS bundling by a base station.

As shown in FIG. 9, in some aspects, process 900 may include performing one or more procedures that support DMRS bundling by a base station (block 910). For example, the UE (e.g., using communication manager 140 and/or communication manager 1408, depicted in FIG. 14) may perform one or more procedures that support DMRS bundling by a base station, as described above.

As further shown in FIG. 9, in some aspects, process 900 may include transmitting set of multiple communications based at least in part on the one or more procedures (block 920). For example, the UE (e.g., using communication manager 140 and/or transmission component 1404, depicted in FIG. 14) may transmit set of multiple communications based at least in part on the one or more procedures, as described above.

Process 900 may include additional aspects, such as any single aspect or any combination of aspects described below and/or in connection with one or more other processes described elsewhere herein.

In a first aspect, performing the one or more procedures comprises performing the one or more procedures during transmissions of the set of multiple communications.

In a second aspect, alone or in combination with the first aspect, performing the one or more procedures that support DMRS bundling by the base station comprises one or more of maintaining phase continuity for the set of multiple communications, or maintaining power consistency for the set of multiple communications.

In a third aspect, alone or in combination with one or more of the first and second aspects, the set of multiple communications comprise repetitions of a random access channel message.

In a fourth aspect, alone or in combination with one or more of the first through third aspects, a transmission channel used for transmitting the set of multiple communications is associated with a non-terrestrial network.

In a fifth aspect, alone or in combination with one or more of the first through fourth aspects, performing the one or more procedures that support DMRS bundling by the base station is based at least in part on a one or more of parameters, within a communication protocol, indicating to perform the one or more procedures that support DMRS bundling by the base station, a power class of the UE, a frequency band of a transmission channel used by the UE for transmitting the set of multiple communications, an orbit type of the satellite associated with the set of multiple communications, or an orbit altitude of the satellite associated with the set of multiple communications.

In a sixth aspect, alone or in combination with one or more of the first through fifth aspects, process 900 includes initiating, before transmitting one or more communications of the set of multiple communications, an access procedure based at least in part on a UE capability to perform the one or more procedures that support DMRS bundling by the base station.

In a seventh aspect, alone or in combination with one or more of the first through sixth aspects, process 900 includes receiving an indication to perform the one or more procedures that support DMRS bundling by the base station.

In an eighth aspect, alone or in combination with one or more of the first through seventh aspects, receiving the indication to perform the one or more procedures that support DMRS bundling by the base station comprises receiving the indication via a system information block.

In a ninth aspect, alone or in combination with one or more of the first through eighth aspects, the indication indicates that the UE is required to perform the one or more procedures that support DMRS bundling by the base station.

In a tenth aspect, alone or in combination with one or more of the first through ninth aspects, the UE is required to perform the one or more procedures that support DMRS bundling by the base station based at least in part on one or more of a power class of the UE, a time associated with transmitting one or more communications of the set of multiple communications, or an elevation angle of a beam associated with transmitting one or more communications of the set of multiple communications.

In an eleventh aspect, alone or in combination with one or more of the first through tenth aspects, the UE is to perform the one or more procedures that support DMRS bundling by the base station based at least in part on one or more of a power class of the UE, a time associated with transmitting one or more communications of the set of multiple communications, or an elevation angle of a beam associated with transmitting one or more communications of the set of multiple communications.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
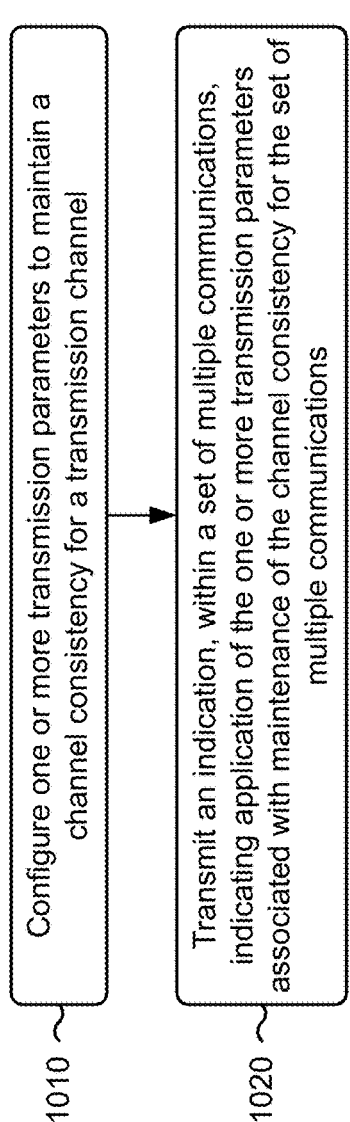

FIG. 10 is a diagram illustrating an example process 1000 performed, for example, by a UE, in accordance with the present disclosure. Example process 1000 is an example where the UE (e.g., UE 120) performs operations associated with support for DMRS bundling by a base station.

As shown in FIG. 10, in some aspects, process 1000 may include configuring one or more transmission parameters to maintain a channel consistency for a transmission channel (block 1010). For example, the UE (e.g., using communication manager 140 and/or transmission component 1404, depicted in FIG. 14) may configure one or more transmission parameters to maintain a channel consistency for a transmission channel, as described above.

As further shown in FIG. 10, in some aspects, process 1000 may include transmitting an indication, within a set of multiple communications, indicating application of the one or more transmission parameters associated with maintenance of the channel consistency for the set of multiple communications (block 1020). For example, the UE (e.g., using communication manager 140 and/or transmission component 1404, depicted in FIG. 14) may transmit an indication, within a set of multiple communications, indicating application of the one or more transmission parameters associated with maintenance of the channel consistency for the set of multiple communications, as described above.

Process 1000 may include additional aspects, such as any single aspect or any combination of aspects described below and/or in connection with one or more other processes described elsewhere herein.

In a first aspect, configuring the one or more transmission parameters to maintain the channel consistency for the transmission channel comprises one or more of maintaining phase continuity for the set of multiple communications, or maintaining power consistency for the set of multiple communications.

In a second aspect, alone or in combination with the first aspect, the set of multiple communications comprise repetitions of a random access channel message.

In a third aspect, alone or in combination with one or more of the first and second aspects, the transmission channel is associated with a non-terrestrial network.

In a fourth aspect, alone or in combination with one or more of the first through third aspects, configuring the one or more transmission parameters to maintain the channel consistency for the transmission channel is based at least in part on a one or more of parameters, within a communication protocol, indicating to maintain the channel consistency for the transmission channel, a power class of the UE, a frequency band of the transmission channel, an orbit type of a satellite associated with the set of multiple communications, or an orbit altitude of the satellite associated with the set of multiple communications.

In a fifth aspect, alone or in combination with one or more of the first through fourth aspects, process 1000 includes initiating, before transmitting the indication within the set of multiple communications, an access procedure based at least in part on a UE capability to configure the one or more transmission parameters to maintain the channel consistency for the transmission channel.

In a sixth aspect, alone or in combination with one or more of the first through fifth aspects, process 1000 includes receiving an indication to maintain the channel consistency for the transmission channel.

In a seventh aspect, alone or in combination with one or more of the first through sixth aspects, receiving the indication to maintain the channel consistency for the transmission channel comprises receiving the indication via a system information block.

In an eighth aspect, alone or in combination with one or more of the first through seventh aspects, the indication indicates that the UE is required to maintain the channel consistency for the transmission channel.

In a ninth aspect, alone or in combination with one or more of the first through eighth aspects, the UE is required to maintain the channel consistency for the transmission channel based at least in part on one or more of a power class of the UE, a time associated with transmitting one or more communications of the set of multiple communications, or an elevation angle of a beam associated with transmitting one or more communications of the set of multiple communications.

In a tenth aspect, alone or in combination with one or more of the first through ninth aspects, the UE is to maintain the channel consistency for the transmission channel based at least in part on one or more of a power class of the UE, a time associated with transmitting one or more communications of the set of multiple communications, or an elevation angle of a beam associated with transmitting one or more communications of the set of multiple communications.

In an eleventh aspect, alone or in combination with one or more of the first through tenth aspects, transmitting the indication within the set of multiple communications comprises transmitting the indication within a bitfield that is multiplexed with a random access channel communication.

In a twelfth aspect, alone or in combination with one or more of the first through eleventh aspects, transmitting the indication within the set of multiple communications comprises transmitting the indication implicitly based at least in part on whether the UE alternates DMRS ports during transmission of the set of multiple communications.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
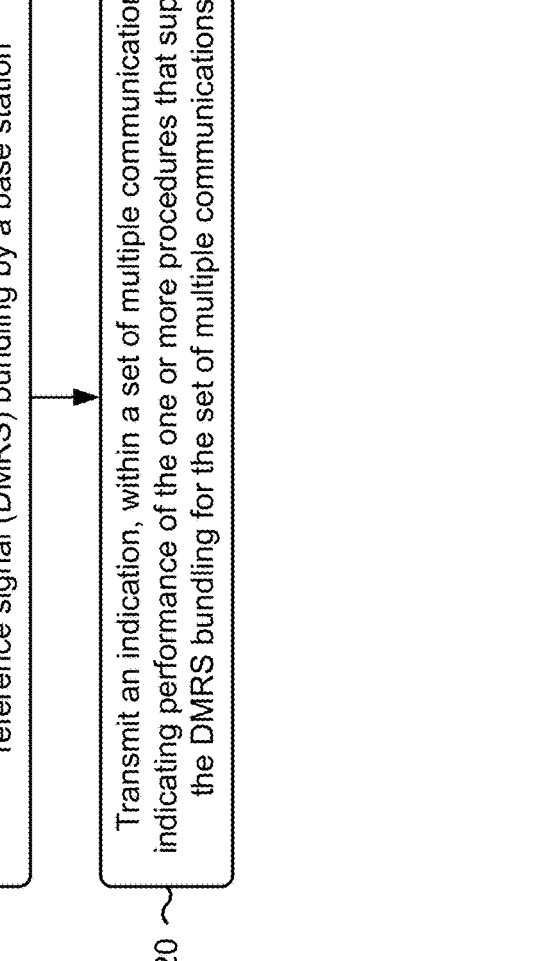

FIG. 11 is a diagram illustrating an example process 1100 performed, for example, by a UE, in accordance with the present disclosure. Example process 1100 is an example where the UE (e.g., UE 120) performs operations associated with support for DMRS bundling by a base station.

As shown in FIG. 11, in some aspects, process 1100 may include performing one or more procedures that support DMRS bundling by a base station (block 1110). For example, the UE (e.g., using communication manager 140 and/or communication manager 1408, depicted in FIG. 14) may perform one or more procedures that support DMRS bundling by a base station, as described above.

As further shown in FIG. 11, in some aspects, process 1100 may include transmitting an indication, within a set of multiple communications, indicating performance of the one or more procedures that support the DMRS bundling for the set of multiple communications (block 1120). For example, the UE (e.g., using communication manager 140 and/or transmission component 1404, depicted in FIG. 14) may transmit an indication, within a set of multiple communications, indicating performance of the one or more procedures that support the DMRS bundling for the set of multiple communications, as described above.

Process 1100 may include additional aspects, such as any single aspect or any combination of aspects described below and/or in connection with one or more other processes described elsewhere herein.

In a first aspect, performing the one or more procedures comprises performing the one or more procedures during transmission of the set of multiple communications.

In a second aspect, alone or in combination with the first aspect, performing the one or more procedures that support DMRS bundling by the base station comprises one or more of maintaining phase continuity for the set of multiple communications, or maintaining power consistency for the set of multiple communications.

In a third aspect, alone or in combination with one or more of the first and second aspects, the set of multiple communications comprise repetitions of a random access channel message.

In a fourth aspect, alone or in combination with one or more of the first through third aspects, a transmission channel used for transmitting the indication within the set of multiple communications is associated with a non-terrestrial network.

In a fifth aspect, alone or in combination with one or more of the first through fourth aspects, performing the one or more procedures that support DMRS bundling by the base station is based at least in part on a one or more of parameters, within a communication protocol, indicating to perform the one or more procedures that support DMRS bundling by the base station, a power class of the UE, a frequency band of a transmission channel used by the UE for transmitting the set of multiple communications, an orbit type of the satellite associated with the set of multiple communications, or an orbit altitude of the satellite associated with the set of multiple communications.

In a sixth aspect, alone or in combination with one or more of the first through fifth aspects, process 1100 includes initiating, before transmitting the indication within the set of multiple communications, an access procedure based at least in part on a UE capability to perform the one or more procedures that support DMRS bundling by the base station.

In a seventh aspect, alone or in combination with one or more of the first through sixth aspects, process 1100 includes receiving an indication to perform the one or more procedures that support DMRS bundling by the base station.

In an eighth aspect, alone or in combination with one or more of the first through seventh aspects, receiving the indication to perform the one or more procedures that support DMRS bundling by the base station comprises receiving the indication via a system information block.

In a ninth aspect, alone or in combination with one or more of the first through eighth aspects, the indication indicates that the UE is required to perform the one or more procedures that support DMRS bundling by the base station.

In a tenth aspect, alone or in combination with one or more of the first through ninth aspects, the UE is required to perform the one or more procedures that support DMRS bundling by the base station based at least in part on one or more of a power class of the UE, a time associated with transmitting one or more communications of the set of multiple communications, or an elevation angle of a beam associated with transmitting one or more communications of the set of multiple communications.

In an eleventh aspect, alone or in combination with one or more of the first through tenth aspects, the UE is to perform the one or more procedures that support DMRS bundling by the base station based at least in part on one or more of a power class of the UE, a time associated with transmitting one or more communications of the set of multiple communications, or an elevation angle of a beam associated with transmitting one or more communications of the set of multiple communications.

In a twelfth aspect, alone or in combination with one or more of the first through eleventh aspects, transmitting the indication within the set of multiple communications comprises transmitting the indication within a bitfield that is multiplexed with a random access channel communication.

In a thirteenth aspect, alone or in combination with one or more of the first through twelfth aspects, transmitting the indication within the set of multiple communications comprises transmitting the indication implicitly based at least in part on whether the UE alternates DMRS ports during transmission of the set of multiple communications.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a base station, in accordance with the present disclosure. Example process 1200 is an example where the base station (e.g., base station 110) performs operations associated with support for DMRS bundling by a base station.

As shown in FIG. 12, in some aspects, process 1200 may include receiving, from a UE via a transmission channel, a set of multiple communications (block 1210). For example, the base station (e.g., using communication manager 150 and/or reception component 1402, depicted in FIG. 14) may receive, from a UE via a transmission channel, a set of multiple communications, as described above.

As further shown in FIG. 12, in some aspects, process 1200 may include applying DMRS bundling across the set of multiple communications based at least in part on an indication comprising one or more of: a first indication within a communication protocol for the UE to support DMRS bundling, a second indication, from the base station, to support DMRS bundling, or a third indication within the set of multiple communications (block 1220). For example, the base station (e.g., using communication manager 150 and/or reception component 1402, depicted in FIG. 15) may apply DMRS bundling across the set of multiple communications based at least in part on an indication comprising one or more of: a first indication within a communication protocol for the UE to support DMRS bundling, a second indication, from the base station, to support DMRS bundling, or a third indication within the set of multiple communications, as described above.

Process 1200 may include additional aspects, such as any single aspect or any combination of aspects described below and/or in connection with one or more other processes described elsewhere herein.

In a first aspect, the indication indicates that the UE is to perform one or more of maintenance of phase continuity for the set of multiple communications, or maintenance of power consistency for the set of multiple communications.

In a second aspect, alone or in combination with the first aspect, the set of multiple communications comprise repetitions of a random access channel message.

In a third aspect, alone or in combination with one or more of the first and second aspects, the transmission channel is associated with a non-terrestrial network.

In a fourth aspect, alone or in combination with one or more of the first through third aspects, applying DMRS bundling across the set of multiple communications is based at least in part on a one or more of a power class of the UE, a frequency band of the transmission channel, an orbit type of a satellite associated with the set of multiple communications, or an orbit altitude of the satellite associated with the set of multiple communications.

In a fifth aspect, alone or in combination with one or more of the first through fourth aspects, process 1200 includes receiving, before receiving one or more communications of the set of multiple communications, an access message based at least in part on a UE capability to support DMRS bundling.

In a sixth aspect, alone or in combination with one or more of the first through fifth aspects, process 1200 includes transmitting the second indication to support DMRS bundling, wherein the second indication to support DMRS bundling comprises one or more of a fourth indication to maintain channel consistency for the transmission channel, or a fifth indication to perform one or more procedures that support DMRS bundling for the set of multiple communications.

In a seventh aspect, alone or in combination with one or more of the first through sixth aspects, transmitting the second indication to support DMRS bundling comprises transmitting the indication via a system information block.

In an eighth aspect, alone or in combination with one or more of the first through seventh aspects, the indication indicates that the UE is required to maintain the channel consistency for the transmission channel.

In a ninth aspect, alone or in combination with one or more of the first through eighth aspects, the UE is required to maintain the channel consistency for the transmission channel based at least in part on one or more of a power class of the UE, a time associated with transmitting one or more communications of the set of multiple communications, or an elevation angle of a beam associated with transmitting one or more communications of the set of multiple communications.

In a tenth aspect, alone or in combination with one or more of the first through ninth aspects, the indication indicates that the UE is to maintain the channel consistency for the transmission channel based at least in part on one or more of a power class of the UE, a time associated with transmitting one or more communications of the set of multiple communications, or an elevation angle of a beam associated with transmitting one or more communications of the set of multiple communications.

In an eleventh aspect, alone or in combination with one or more of the first through tenth aspects, the second indication to support DMRS bundling comprises one or more of an indication to maintain channel consistency for the transmission channel, or an indication to perform one or more procedures that support DMRS bundling by the base station.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
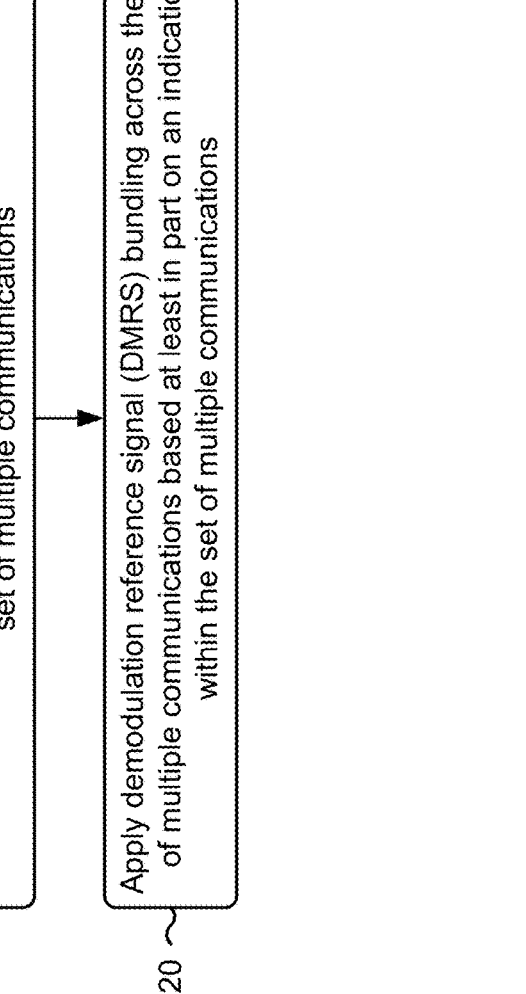

FIG. 13 is a diagram illustrating an example process 1300 performed, for example, by a base station, in accordance with the present disclosure. Example process 1300 is an example where the base station (e.g., base station 110) performs operations associated with support for DMRS bundling by a base station.

As shown in FIG. 13, in some aspects, process 1300 may include receiving, from a UE via a transmission channel, a set of multiple communications (block 1310). For example, the base station (e.g., using communication manager 150 and/or reception component 1402, depicted in FIG. 14) may receive, from a UE via a transmission channel, a set of multiple communications, as described above.

As further shown in FIG. 13, in some aspects, process 1300 may include applying DMRS bundling across the set of multiple communications based at least in part on an indication within the set of multiple communications (block 1320). For example, the base station (e.g., using communication manager 150 and/or reception component 1402, depicted in FIG. 14) may apply DMRS bundling across the set of multiple communications based at least in part on an indication within the set of multiple communications, as described above.

Process 1300 may include additional aspects, such as any single aspect or any combination of aspects described below and/or in connection with one or more other processes described elsewhere herein.

In a first aspect, the indication within the set of multiple communications comprises one or more of an indication of application of one or more transmission parameters associated with maintenance of channel consistency for the set of multiple communications, or performance of one or more procedures that support DMRS bundling for the set of multiple communications.

In a second aspect, alone or in combination with the first aspect, the one or more transmission parameters to maintain the channel consistency for the transmission channel comprise one or more of maintenance of phase continuity for the set of multiple communications, or maintenance of power consistency for the set of multiple communications.

In a third aspect, alone or in combination with one or more of the first and second aspects, the set of multiple communications comprise repetitions of a random access channel message.

In a fourth aspect, alone or in combination with one or more of the first through third aspects, the transmission channel is associated with a non-terrestrial network.

In a fifth aspect, alone or in combination with one or more of the first through fourth aspects, process 1300 includes receiving, before receiving one or more communications of the set of multiple communications, an access message based at least in part on a UE capability to support DMRS bundling.

In a sixth aspect, alone or in combination with one or more of the first through fifth aspects, process 1300 includes transmitting an indication to support DMRS bundling, wherein the indication to support DMRS bundling comprises one or more of a first indication to maintain channel consistency for the transmission channel, or a second indication to perform one or more procedures that support DMRS bundling for the set of multiple communications.

In a seventh aspect, alone or in combination with one or more of the first through sixth aspects, transmitting the indication to support DMRS bundling comprises transmitting the indication via a system information block.

In an eighth aspect, alone or in combination with one or more of the first through seventh aspects, the indication indicates that the UE is required to support DMRS bundling.

In a ninth aspect, alone or in combination with one or more of the first through eighth aspects, the indication indicates that the UE is required to support DMRS bundling based at least in part on one or more of a power class of the UE, a time associated with transmitting one or more communications of the set of multiple communications, or an elevation angle of a beam associated with transmitting one or more communications of the set of multiple communications.

In a tenth aspect, alone or in combination with one or more of the first through ninth aspects, the indication indicates that the UE is to support DMRS bundling based at least in part on one or more of a power class of the UE, a time associated with transmitting one or more communications of the set of multiple communications, or an elevation angle of a beam associated with transmitting one or more communications of the set of multiple communications.

In an eleventh aspect, alone or in combination with one or more of the first through tenth aspects, receiving the indication within the set of multiple communications comprises receiving the indication within a bitfield that is multiplexed with a random access channel communication.

In a twelfth aspect, alone or in combination with one or more of the first through eleventh aspects, receiving the indication within the set of multiple communications comprises receiving the indication implicitly based at least in part on whether the UE alternates DMRS ports during transmission of the set of multiple communications.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
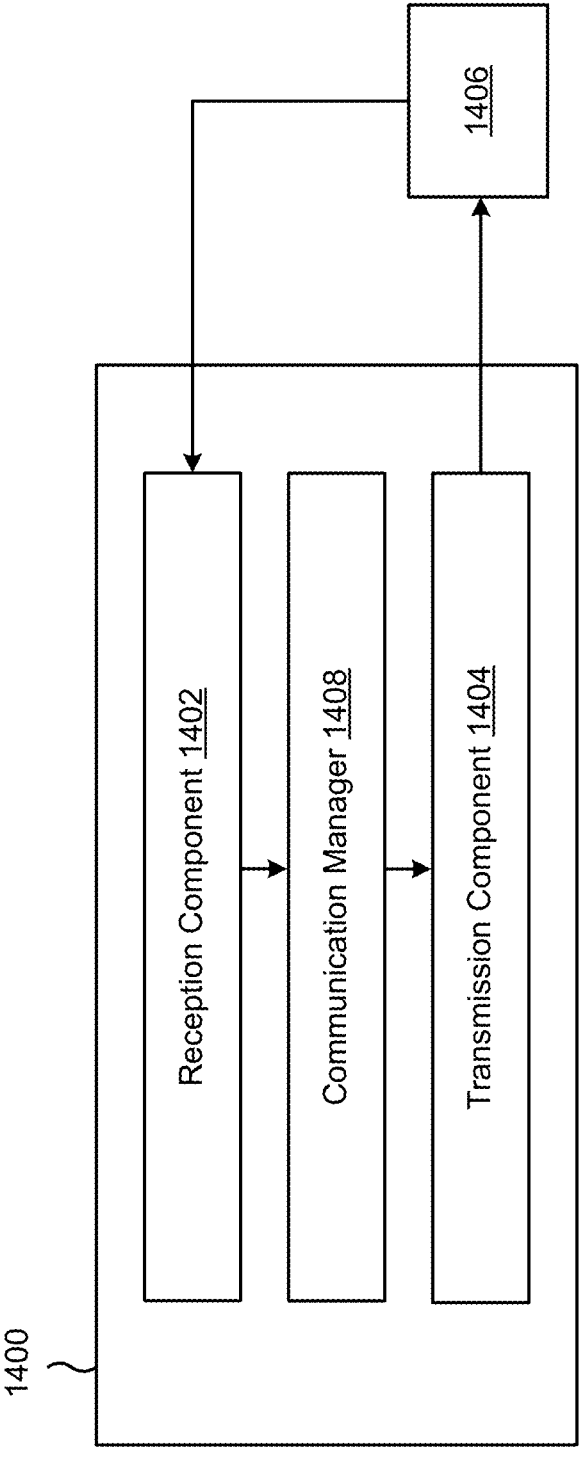
FIG. 14 is a diagram of an example apparatus for wireless communication, in accordance with the present disclosure.

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a communication manager 1408 (e.g., the communication manager 140).

In some aspects, the apparatus 1400 may be configured to perform one or more operations described herein in connection with FIGS. 5-7. Additionally, or alternatively, the apparatus 1400 may be configured to perform one or more processes described herein, such as process 800 of FIG. 8, process 900 of FIG. 9, process 1000 of FIG. 10, process 1100 of FIG. 11, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The transmission component 1404 may configure one or more transmission parameters to maintain a channel consistency for a transmission channel. The transmission component 1404 may transmit, via the transmission channel, a set of multiple communications using the one or more transmission parameters.

The communication manager 1408 may initiate, before transmitting one or more communications of the set of multiple communications, an access procedure based at least in part on a UE capability to configure the one or more transmission parameters to maintain the channel consistency for the transmission channel.

The reception component 1402 may receive an indication to maintain the channel consistency for the transmission channel.

The transmission component 1404 may perform one or more procedures that support DMRS bundling by a base station. The transmission component 1404 may transmit set of multiple communications based at least in part on the one or more procedures.

The communication manager 1408 may initiate, before transmitting one or more communications of the set of multiple communications, an access procedure based at least in part on a UE capability to perform the one or more procedures that support DMRS bundling by the base station.

The reception component 1402 may receive an indication to perform the one or more procedures that support DMRS bundling by the base station.

The transmission component 1404 may configure one or more transmission parameters to maintain a channel consistency for a transmission channel. The transmission component 1404 may transmit an indication, within a set of multiple communications, indicating application of the one or more transmission parameters associated with maintenance of the channel consistency for the set of multiple communications.

The communication manager 1408 may initiate, before transmitting the indication within the set of multiple communications, an access procedure based at least in part on a UE capability to configure the one or more transmission parameters to maintain the channel consistency for the transmission channel.

The reception component 1402 may receive an indication to maintain the channel consistency for the transmission channel.

The transmission component 1404 may perform one or more procedures that support DMRS bundling by a base station. The transmission component 1404 may transmit an indication, within a set of multiple communications, indicating performance of the one or more procedures that support the DMRS bundling for the set of multiple communications.

The communication manager 1408 may initiate, before transmitting the indication within the set of multiple communications, an access procedure based at least in part on a UE capability to perform the one or more procedures that support DMRS bundling by the base station.

The reception component 1402 may receive an indication to perform the one or more procedures that support DMRS bundling by the base station.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
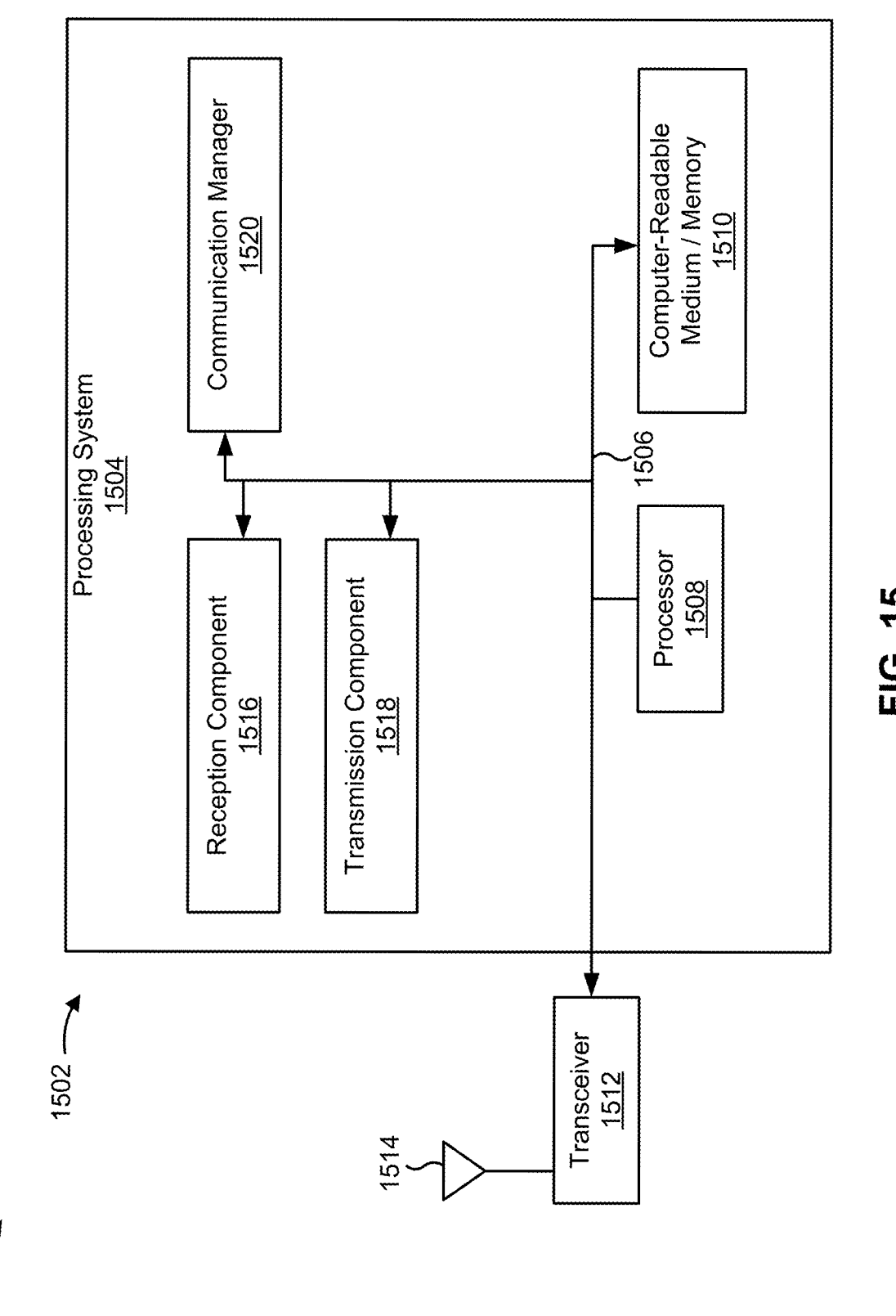
FIG. 15 is a diagram illustrating an example of a hardware implementation for an apparatus employing a processing system, in accordance with the present disclosure.

FIG. 15 is a diagram illustrating an example 1500 of a hardware implementation for an apparatus 1502 employing a processing system 1504. The apparatus 1502 may be, be similar to, include, or be included in the apparatus 1400 shown in FIG. 14. For example, the apparatus 1502 may be, or include, a base station or a UE.

The processing system 1504 may be implemented with a bus architecture, represented generally by the bus 1506. The bus 1506 may include any number of interconnecting buses and bridges depending on the specific application of the processing system 1504 and the overall design constraints. The bus 1506 links together various circuits including one or more processors and/or hardware components, represented by a processor 1508, the illustrated components, and the computer-readable medium/memory 1510. The bus 1506 may also link various other circuits, such as timing sources, peripherals, voltage regulators, power management circuits, and/or the like.

The processing system 1504 may be coupled to a transceiver 1512. The transceiver 1512 is coupled to one or more antennas 1514. The transceiver 1512 provides a means for communicating with various other apparatuses over a transmission medium. The transceiver 1512 receives a signal from the one or more antennas 1514, extracts information from the received signal, and provides the extracted information to the processing system 1504, specifically a reception component 1516. In addition, the transceiver 1512 receives information from the processing system 1504, specifically a transmission component 1518, and generates a signal to be applied to the one or more antennas 1514 based at least in part on the received information.

The processor 1508 is coupled to the computer-readable medium/memory 1510. The processor 1508 is responsible for general processing, including the execution of software stored on the computer-readable medium/memory 1510. The software, when executed by the processor 1508, causes the processing system 1504 to perform the various functions described herein in connection with a receiving device. The computer-readable medium/memory 1510 may also be used for storing data that is manipulated by the processor 1508 when executing software. The processing system also may include a communication manager 1520. The communication manager 1520 may organize, prioritize, activate, facilitate and/or otherwise manage communication operations performed by the apparatus 1502. The processing system 1504 may include any number of additional components not illustrated in FIG. 15. The components illustrated and/or not illustrated may be software modules running in the processor 1508, resident/stored in the computer readable medium/ memory 1510, one or more hardware modules coupled to the processor 1508, or some combination thereof.

In some aspects, the processing system 1504 may be a component of the base station 110 and may include the memory 242 and/or at least one of the TX MIMO processor 230, the receive processor 238, and/or the controller/processor 240. In some aspects, the processing system 1504 may be a component of the UE 120 and may include the memory 282 and/or at least one of the TX MIMO processor 266, the receive processor 258, and/or the controller/processor 280. In some aspects, the apparatus 1502 for wireless communication provides means for receiving, from a transmitting device, an aggregated signal including a plurality of frequency division multiplexing (FDM) signals corresponding to a plurality of beams, each of the plurality of FDM signals comprising a waveform associated with a respective inverse fast Fourier transform (iFFT) component of a plurality of iFFT components; and means for decoding the plurality of FDM signals.

In some aspects, the apparatus 1502 for wireless communication provides means for configuring one or more transmission parameters to maintain a channel consistency for a transmission channel. In some aspects, the apparatus 1502 for wireless communication provides means for transmitting, via the transmission channel, a set of multiple communications using the one or more transmission parameters.

In some aspects, the apparatus 1502 for wireless communication provides means for initiating, before transmitting one or more communications of the set of multiple communications, an access procedure based at least in part on a UE capability to configure the one or more transmission parameters to maintain the channel consistency for the transmission channel. In some aspects, the apparatus 1502 for wireless communication provides means for receiving an indication to maintain the channel consistency for the transmission channel.

In some aspects, the apparatus 1502 for wireless communication provides means for performing one or more procedures that support DMRS bundling by a base station. In some aspects, the apparatus 1502 for wireless communication provides means for transmitting set of multiple communications based at least in part on the one or more procedures.

In some aspects, the apparatus 1502 for wireless communication provides means for initiating, before transmitting one or more communications of the set of multiple communications, an access procedure based at least in part on a UE capability to perform the one or more procedures that support DMRS bundling by the base station.

In some aspects, the apparatus 1502 for wireless communication provides means for receiving an indication to perform the one or more procedures that support DMRS bundling by the base station.

In some aspects, the apparatus 1502 for wireless communication provides means for configuring one or more transmission parameters to maintain a channel consistency for a transmission channel. In some aspects, the apparatus 1502 for wireless communication provides means for transmitting an indication, within a set of multiple communications, indicating application of the one or more transmission parameters associated with maintenance of the channel consistency for the set of multiple communications.

In some aspects, the apparatus 1502 for wireless communication provides means for initiating, before transmitting the indication within the set of multiple communications, an access procedure based at least in part on a UE capability to configure the one or more transmission parameters to maintain the channel consistency for the transmission channel.

In some aspects, the apparatus 1502 for wireless communication provides means for receiving an indication to maintain the channel consistency for the transmission channel.

In some aspects, the apparatus 1502 for wireless communication provides means for performing one or more procedures that support DMRS bundling by a base station. In some aspects, the apparatus 1502 for wireless communication provides means for transmitting an indication, within a set of multiple communications, indicating performance of the one or more procedures that support the DMRS bundling for the set of multiple communications.

In some aspects, the apparatus 1502 for wireless communication provides means for initiating, before transmitting the indication within the set of multiple communications, an access procedure based at least in part on a UE capability to perform the one or more procedures that support DMRS bundling by the base station.

In some aspects, the apparatus 1502 for wireless communication provides means for receiving an indication to perform the one or more procedures that support DMRS bundling by the base station.

The aforementioned means may be one or more of the aforementioned components of the processing system 1504 of the apparatus 1502 configured to perform the functions recited by the aforementioned means. As described elsewhere herein, the processing system 1504 may include the TX MIMO processor 230, the reception (RX) processor 238, the controller/processor 240, the memory 282, the TX MIMO processor 266, the receive processor 258, and/or the controller/processor 280. In one configuration, the aforementioned means may be the TX MIMO processor 230, the RX processor 238, the controller/processor 240, the memory 282, the TX MIMO processor 266, the receive processor 258, and/or the controller/processor 280 configured to perform the functions and/or operations recited herein.

FIG. 15 is provided as an example. Other examples may differ from what is described in connection with FIG. 15.

Figure 16:
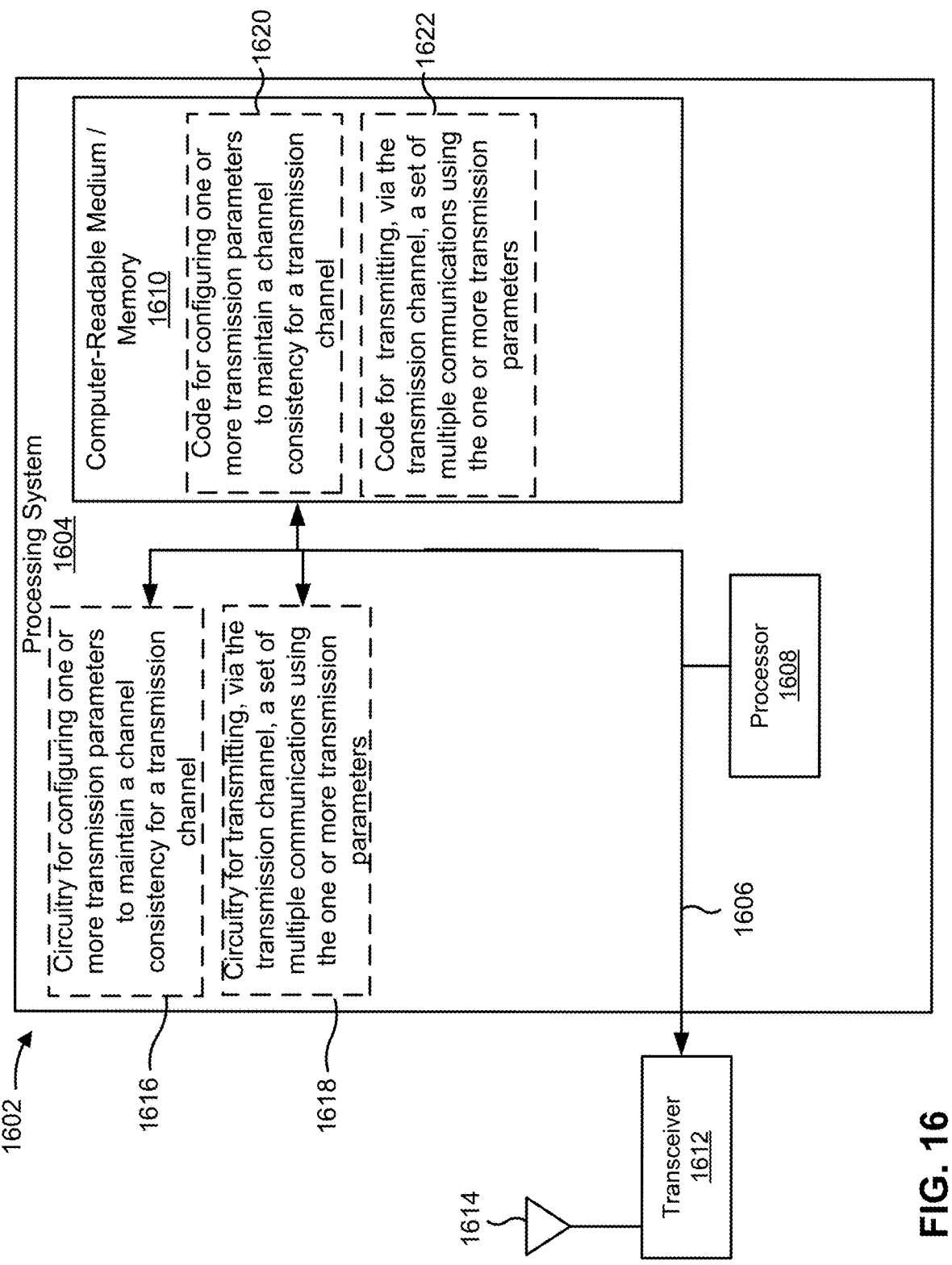
FIG. 16 is a diagram illustrating an example implementation of code and circuitry for an apparatus, in accordance with the present disclosure.

FIG. 16 is a diagram illustrating an example 1600 of an implementation of code and circuitry for an apparatus 1602 for wireless communication. The apparatus 1602 may be, be similar to, include, or be included in the apparatus 1400 shown in FIG. 14, and/or the apparatus 1502 shown in FIG. 15. For example, the apparatus 1602 may be, or include, a base station. The apparatus 1602 may include a processing system 1604, which may include a bus 1606 coupling one or more components such as, for example, a processor 1608, computer-readable medium/memory 1610, a transceiver 1612, and/or the like. As shown, the transceiver 1612 may be coupled to one or more antennas 1614.

As further shown in FIG. 16, the apparatus 1602 may include circuitry for configuring one or more transmission parameters to maintain a channel consistency for a transmission channel (circuitry 1616). For example, the apparatus 1602 may include circuitry 1616 to enable the apparatus to maintain phase continuity and/or power consistency for the transmission channel.

As further shown in FIG. 16, the apparatus 1602 may include circuitry for transmitting, via the transmission channel, a set of multiple communications using the one or more transmission parameters (circuitry 1618). For example, the apparatus 1602 may include circuitry 1618 to enable the apparatus 1602 to transmit, via the transmission channel, a set of multiple communications using the one or more transmission parameters to maintain phase continuity and/or power consistency for the transmission channel.

In some aspects, the apparatus 1602 may include circuitry for performing one or more procedures that support DMRS bundling by a base station and transmitting set of multiple communications based at least in part on the one or more procedures.

In some aspects, the apparatus 1602 may include circuitry for configuring one or more transmission parameters to maintain a channel consistency for a transmission channel and transmitting an indication, within a set of multiple communications, indicating application of the one or more transmission parameters associated with maintenance of the channel consistency for the set of multiple communications.

In some aspects, the apparatus 1602 may include circuitry for performing one or more procedures that support DMRS bundling by a base station and transmitting an indication, within a set of multiple communications, indicating performance of the one or more procedures that support the DMRS bundling for the set of multiple communications.

As further shown in FIG. 16, the apparatus 1602 may include, stored in computer-readable medium 1610, code for configuring one or more transmission parameters to maintain a channel consistency for a transmission channel (code 1620). For example, the apparatus 1602 may include code 1620 that, when executed by the processor 1608, may cause the transceiver 1612 to configure one or more transmission parameters to maintain a channel consistency for a transmission channel.

As further shown in FIG. 16, the apparatus 1602 may include, stored in computer-readable medium 1610, code for transmitting, via the transmission channel, a set of multiple communications using the one or more transmission parameters (code 1622). For example, the apparatus 1602 may include code 1622 that, when executed by the processor 1608, may cause the apparatus 1602 to transmit, via the transmission channel, a set of multiple communications using the one or more transmission parameters.

The apparatus 1602 may include, stored in computer-readable medium 1610, code for performing one or more procedures that support DMRS bundling by a base station and transmitting set of multiple communications based at least in part on the one or more procedures.

The apparatus 1602 may include, stored in computer-readable medium 1610, code for configuring one or more transmission parameters to maintain a channel consistency for a transmission channel and transmitting an indication, within a set of multiple communications, indicating application of the one or more transmission parameters associated with maintenance of the channel consistency for the set of multiple communications FIG. 16 is provided as an example. Other examples may differ from what is described in connection with FIG. 16.

Figure 17:
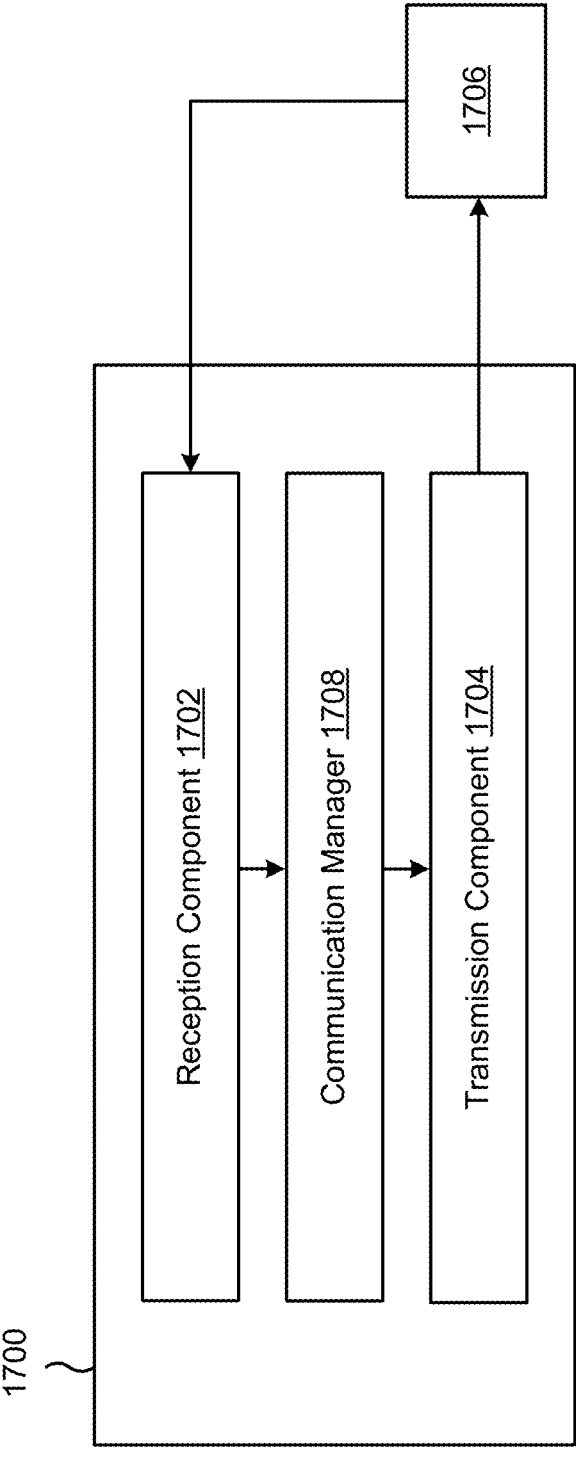
FIG. 17 is a diagram of an example apparatus for wireless communication, in accordance with the present disclosure.

FIG. 17 is a diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include a communication manager 1708 (e.g., the communication manager 150).

In some aspects, the apparatus 1700 may be configured to perform one or more operations described herein in connection with FIGS. 5-7. Additionally, or alternatively, the apparatus 1700 may be configured to perform one or more processes described herein, such as process 1200 of FIG. 12, process 1300 of FIG. 13, or a combination thereof. In some aspects, the apparatus 1700 and/or one or more components shown in FIG. 17 may include one or more components of the base station described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the base station described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the base station described in connection with FIG. 2. In some aspects, the transmission component 1704 may be co-located with the reception component 1702 in a transceiver.

The reception component 1702 may receive, from a UE via a transmission channel, a set of multiple communications. The reception component 1702 may apply DMRS bundling across the set of multiple communications based at least in part on an indication comprising one or more of a first indication within a communication protocol for the UE to support DMRS bundling, a second indication, from the base station, to support DMRS bundling, or a third indication within the set of multiple communications.

The reception component 1702 may receive, before receiving one or more communications of the set of multiple communications, an access message based at least in part on a UE capability to support DMRS bundling.

The transmission component 1704 may transmit the second indication to support DMRS bundling wherein the second indication to support DMRS bundling comprises one or more of: a fourth indication to maintain channel consistency for the transmission channel, or a fifth indication to perform one or more procedures that support DMRS bundling for the set of multiple communications.

The reception component 1702 may receive, from a UE via a transmission channel, a set of multiple communications. The reception component 1702 may apply DMRS bundling across the set of multiple communications based at least in part on an indication within the set of multiple communications.

The reception component 1702 may receive, before receiving one or more communications of the set of multiple communications, an access message based at least in part on a UE capability to support DMRS bundling.

The transmission component 1704 may transmit an indication to support DMRS bundling wherein the indication to support DMRS bundling comprises one or more of: a first indication to maintain channel consistency for the transmission channel, or a second indication to perform one or more procedures that support DMRS bundling for the set of multiple communications.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
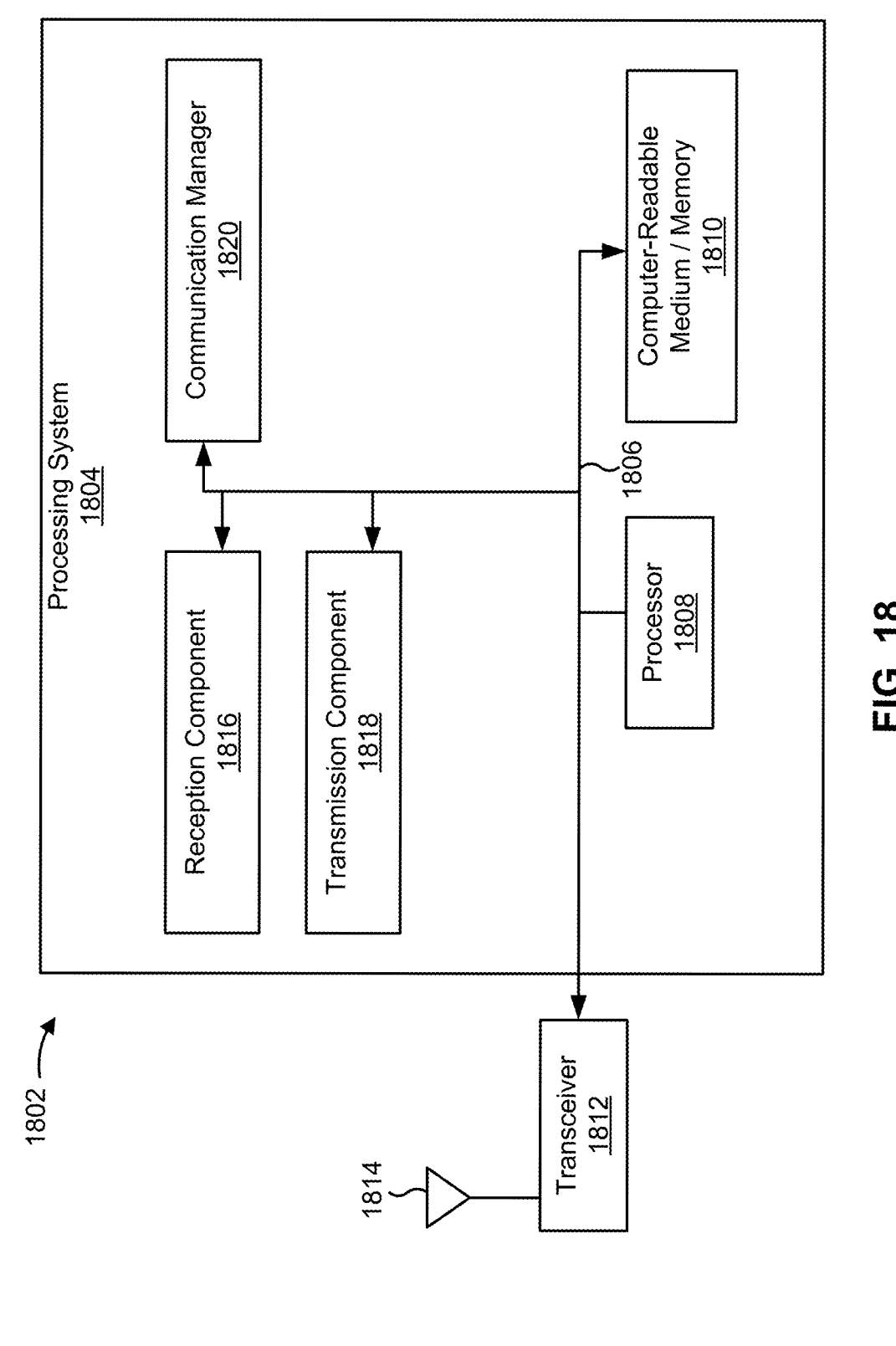
FIG. 18 is a diagram illustrating an example of a hardware implementation for an apparatus employing a processing system, in accordance with the present disclosure.

FIG. 18 is a diagram illustrating an example 1800 of a hardware implementation for an apparatus 1802 employing a processing system 1804. The apparatus 1802 may be, be similar to, include, or be included in the apparatus 1700 shown in FIG. 17. For example, the apparatus 1802 may be, or include, a base station or a UE.

The processing system 1804 may be implemented with a bus architecture, represented generally by the bus 1806. The bus 1806 may include any number of interconnecting buses and bridges depending on the specific application of the processing system 1804 and the overall design constraints. The bus 1806 links together various circuits including one or more processors and/or hardware components, represented by a processor 1808, the illustrated components, and the computer-readable medium/memory 1810. The bus 1806 may also link various other circuits, such as timing sources, peripherals, voltage regulators, power management circuits, and/or the like.

The processing system 1804 may be coupled to a transceiver 1812. The transceiver 1812 is coupled to one or more antennas 1814. The transceiver 1812 provides a means for communicating with various other apparatuses over a transmission medium. The transceiver 1812 receives a signal from the one or more antennas 1814, extracts information from the received signal, and provides the extracted information to the processing system 1804, specifically a reception component 1816. In addition, the transceiver 1812 receives information from the processing system 1804, specifically a transmission component 1818, and generates a signal to be applied to the one or more antennas 1814 based at least in part on the received information.

The processor 1808 is coupled to the computer-readable medium/memory 1810. The processor 1808 is responsible for general processing, including the execution of software stored on the computer-readable medium/memory 1810. The software, when executed by the processor 1808, causes the processing system 1804 to perform the various functions described herein in connection with a receiving device. The computer-readable medium/memory 1810 may also be used for storing data that is manipulated by the processor 1808 when executing software. The processing system also may include a communication manager 1820. The communication manager 1820 may organize, prioritize, activate, facilitate and/or otherwise manage communication operations performed by the apparatus 1802. The processing system 1804 may include any number of additional components not illustrated in FIG. 18. The components illustrated and/or not illustrated may be software modules running in the processor 1808, resident/stored in the computer readable medium/ memory 1810, one or more hardware modules coupled to the processor 1808, or some combination thereof.

In some aspects, the processing system 1804 may be a component of the base station 110 and may include the memory 242 and/or at least one of the TX MIMO processor 230, the receive processor 238, and/or the controller/processor 240. In some aspects, the processing system 1804 may be a component of the UE 120 and may include the memory 282 and/or at least one of the TX MIMO processor 266, the receive processor 258, and/or the controller/processor 280. In some aspects, the apparatus 1802 for wireless communication provides means for receiving, from a transmitting device, an aggregated signal including a plurality of FDM signals corresponding to a plurality of beams, each of the plurality of FDM signals comprising a waveform associated with a respective iFFT component of a plurality of iFFT components; and means for decoding the plurality of FDM signals.

In some aspects, the apparatus 1802 for wireless communication provides means for receiving, from a UE via a transmission channel, a set of multiple communications. In some aspects, the apparatus 1802 for wireless communication provides means for applying DMRS bundling across the set of multiple communications based at least in part on an indication comprising one or more of a first indication within a communication protocol for the UE to support DMRS bundling, a second indication, from the apparatus, to support DMRS bundling, or a third indication within the set of multiple communications.

In some aspects, the apparatus 1802 for wireless communication provides means for receiving, before receiving one or more communications of the set of multiple communications, an access message based at least in part on a UE capability to support DMRS bundling.

In some aspects, the apparatus 1802 for wireless communication provides means for transmitting the second indication to support DMRS bundling wherein the second indication to support DMRS bundling comprises one or more of: a fourth indication to maintain channel consistency for the transmission channel, or a fifth indication to perform one or more procedures that support DMRS bundling for the set of multiple communications.

In some aspects, the apparatus 1802 for wireless communication provides means for receiving, from a UE via a transmission channel, a set of multiple communications. In some aspects, the apparatus 1802 for wireless communication provides means for applying DMRS bundling across the set of multiple communications based at least in part on an indication within the set of multiple communications.

In some aspects, the apparatus 1802 for wireless communication provides means for receiving, before receiving one or more communications of the set of multiple communications, an access message based at least in part on a UE capability to support DMRS bundling.

In some aspects, the apparatus 1802 for wireless communication provides means for transmitting an indication to support DMRS bundling wherein the indication to support DMRS bundling comprises one or more of: a first indication to maintain channel consistency for the transmission channel, or a second indication to perform one or more procedures that support DMRS bundling for the set of multiple communications.

The aforementioned means may be one or more of the aforementioned components of the processing system 1804 of the apparatus 1802 configured to perform the functions recited by the aforementioned means. As described elsewhere herein, the processing system 1804 may include the TX MIMO processor 230, the RX processor 238, the controller/processor 240, the memory 282, the TX MIMO processor 266, the receive processor 258, and/or the controller/processor 280. In one configuration, the aforementioned means may be the TX MIMO processor 230, the RX processor 238, the controller/processor 240, the memory 282, the TX MIMO processor 266, the receive processor 258, and/or the controller/processor 280 configured to perform the functions and/or operations recited herein.

FIG. 18 is provided as an example. Other examples may differ from what is described in connection with FIG. 18.

Figure 19:
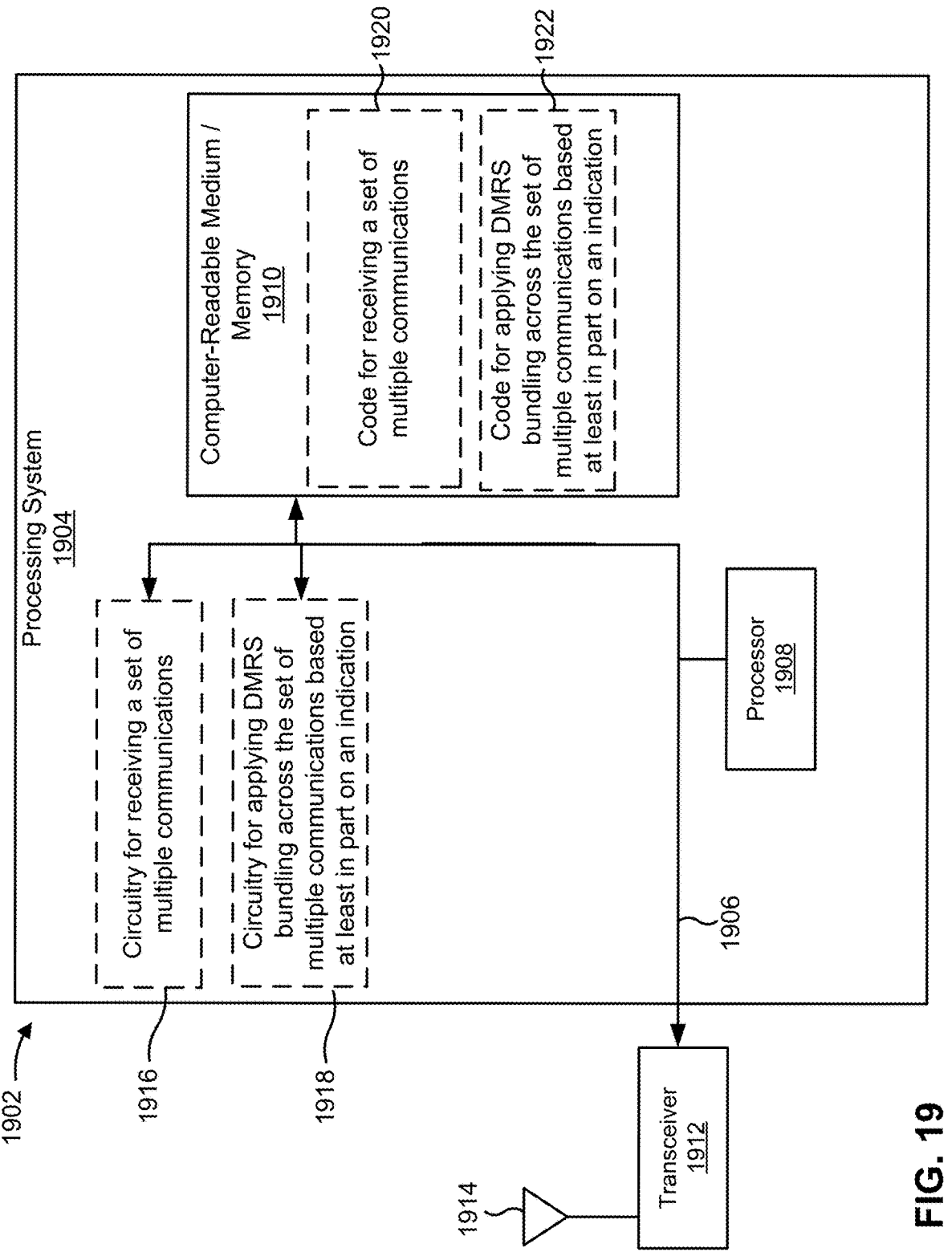
FIG. 19 is a diagram illustrating an example implementation of code and circuitry for an apparatus, in accordance with the present disclosure.

FIG. 19 is a diagram illustrating an example 1900 of an implementation of code and circuitry for an apparatus 1902 for wireless communication. The apparatus 1902 may be, be similar to, include, or be included in the apparatus 1700 shown in FIG. 17, and/or the apparatus 1802 shown in FIG. 18. For example, the apparatus 1902 may be, or include, a base station. The apparatus 1902 may include a processing system 1904, which may include a bus 1906 coupling one or more components such as, for example, a processor 1908, computer-readable medium/memory 1910, a transceiver 1912, and/or the like. As shown, the transceiver 1912 may be coupled to one or more antennas 1914.

As further shown in FIG. 19, the apparatus 1902 may include circuitry for receiving (e.g., from a UE via a transmission channel) a set of multiple communications (circuitry 1916). For example, the apparatus 1902 may include circuitry 1916 to enable the apparatus to receive the set of multiple communications.

As further shown in FIG. 19, the apparatus 1902 may include circuitry for applying DMRS bundling across the set of multiple communications based at least in part on an indication (circuitry 1918). For example, the apparatus 1902 may include circuitry 1918 to enable the apparatus 1902 to apply DMRS bundling across the set of multiple communications based at least in part on an indication comprising one or more of a first indication within a communication protocol for the UE to support DMRS bundling, a second indication, from the base station, to support DMRS bundling, or a third indication within the set of multiple communications.

In some aspects, the apparatus 1902 may include circuitry for receiving, from a UE via a transmission channel, a set of multiple communications and for applying DMRS bundling across the set of multiple communications based at least in part on an indication within the set of multiple communications.

As further shown in FIG. 19, the apparatus 1902 may include, stored in computer-readable medium 1910, code for receiving (e.g., from a UE via a transmission channel) a set of multiple communications (code 1920). For example, the apparatus 1902 may include code 1920 that, when executed by the processor 1908, may cause the transceiver 1912 to receive the set of multiple communications.

As further shown in FIG. 19, the apparatus 1902 may include, stored in computer-readable medium 1910, code for applying DMRS bundling across the set of multiple communications based at least in part on an indication (code 1922). For example, the apparatus 1902 may include code 1922 that, when executed by the processor 1908, may cause the apparatus 1902 to apply DMRS bundling across the set of multiple communications based at least in part on an indication comprising one or more of a first indication within a communication protocol for the UE to support DMRS bundling, a second indication, from the base station, to support DMRS bundling, or a third indication within the set of multiple communications.

The apparatus 1902 may include, stored in computer-readable medium 1910, code for receiving, from a UE via a transmission channel, a set of multiple communications and for applying DMRS bundling across the set of multiple communications based at least in part on an indication within the set of multiple communications.

FIG. 19 is provided as an example. Other examples may differ from what is described in connection with FIG. 19.

Figure 20:
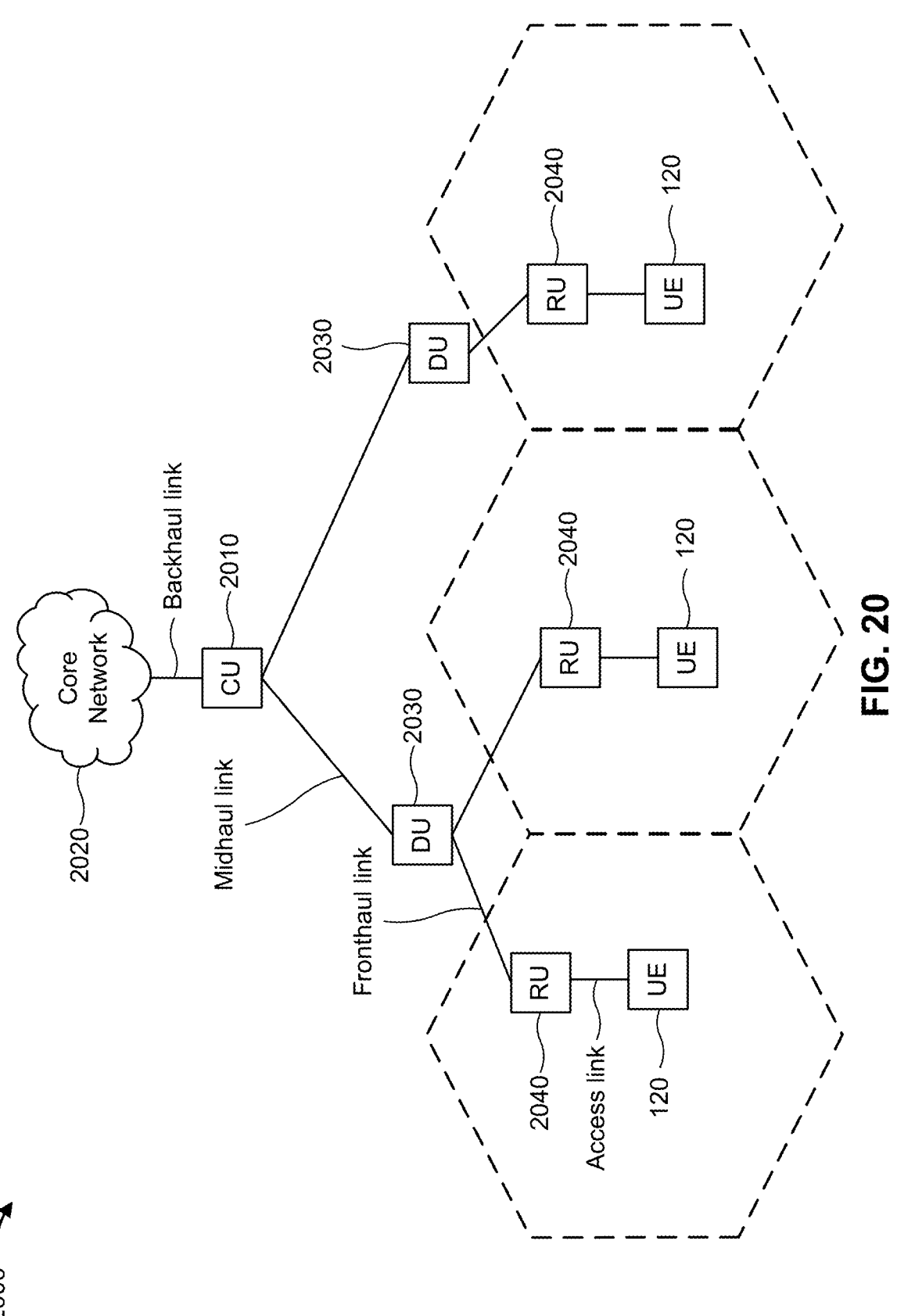
FIG. 20 is a diagram illustrating an example of an O-RAN architecture, in accordance with the present disclosure.

FIG. 20 is a diagram illustrating an example 2000 of an O-RAN architecture, in accordance with the present disclosure. As shown in FIG. 20, the O-RAN architecture may include a control unit (CU) 2010 that communicates with a core network 2020 via a backhaul link. Furthermore, the CU 2010 may communicate with one or more distributed units (DUs) 2030 via respective midhaul links. The DUs 2030 may each communicate with one or more radio units (RUs) 2040 via respective fronthaul links, and the RUs 2040 may each communicate with respective UEs 120 via radio frequency (RF) access links. The DUs 2030 and the RUs 2040 may also be referred to as O-RAN DUs (O-DUs) 2030 and O-RAN RUs (O-RUs) 2040, respectively.

In some aspects, the DUs 2030 and the RUs 2040 may be implemented according to a functional split architecture in which functionality of a base station 110 (e.g., an eNB or a gNB) is provided by a DU 2030 and one or more RUs 2040 that communicate over a fronthaul link. Accordingly, as described herein, a base station 110 may include a DU 2030 and one or more RUs 2040 that may be co-located or geographically distributed. In some aspects, the DU 2030 and the associated RU(s) 2040 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 2030 may correspond to a logical unit that includes one or more base station functions to control the operation of one or more RUs 2040. For example, in some aspects, the DU 2030 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), RRC, and/or service data adaptation protocol (SDAP), may be hosted by the CU 2010. The RU(s) 2040 controlled by a DU 2030 may correspond to logical nodes that host RF processing functions and low-PHY layer functions (e.g., fast Fourier transform (FFT), iFFT, digital beamforming, and/or PRACH extraction and filtering) based at least in part on the lower layer functional split. Accordingly, in an O-RAN architecture, the RU(s) 2040 handle all over the air (OTA) communication with a UE 120, and real-time and non-real-time aspects of control and user plane communication with the RU(s) 2040 are controlled by the corresponding DU 2030, which enables the DU(s) 2030 and the CU 2010 to be implemented in a cloud-based RAN architecture.

In some aspects, the UE 120 and base station may perform support for DMRS bundling by the radio unit 2040. For example, the UE may configuring one or more transmission parameters to maintain a channel consistency for a transmission channel from the UE to the RU 2040. Additionally, or alternatively, the UE may maintain phase continuity for a set of multiple communications and/or power consistency for the set of multiple communications (e.g., while transmitting the set of multiple communications).

As indicated above, FIG. 20 is provided as an example. Other examples may differ from what is described with regard to FIG. 20.

Aspect 1: A method of wireless communication performed at a user equipment (UE), comprising: configuring one or more transmission parameters to maintain a channel consistency for a transmission channel; and transmitting, via the transmission channel, a set of multiple communications using the one or more transmission parameters.

Aspect 2: The method of Aspect 1, wherein configuring the one or more transmission parameters to maintain the channel consistency for the transmission channel comprises one or more of: maintaining phase continuity for the set of multiple communications, or maintaining power consistency for the set of multiple communications.

Aspect 3: The method of any of Aspects 1-2, wherein the set of multiple communications comprise repetitions of a random access channel message.

Aspect 4: The method of any of Aspects 1-3, wherein the transmission channel is associated with a non-terrestrial network.

Aspect 5: The method of any of Aspects 1-4, wherein configuring the one or more transmission parameters to maintain the channel consistency for the transmission channel is based at least in part on a one or more of: parameters, within a communication protocol, indicating to maintain the channel consistency for the transmission channel, a power class of the UE, a frequency band of the transmission channel, an orbit type of a satellite associated with the set of multiple communications, or an orbit altitude of the satellite associated with the set of multiple communications.

Aspect 6: The method of any of Aspects 1-5, further comprising: initiating, before transmitting one or more communications of the set of multiple communications, an access procedure based at least in part on a UE capability to configure the one or more transmission parameters to maintain the channel consistency for the transmission channel.

Aspect 7: The method of any of Aspects 1-6, further comprising: receiving an indication to maintain the channel consistency for the transmission channel.

Aspect 8: The method of Aspect 7, wherein receiving the indication to maintain the channel consistency for the transmission channel comprises: receiving the indication via a system information block.

Aspect 9: The method of any of Aspects 7-8, wherein the indication to maintain the channel consistency for the transmission channel indicates that the UE is required to maintain the channel consistency for the transmission channel.

Aspect 10: The method of Aspect 9, wherein the UE is required to maintain the channel consistency for the transmission channel based at least in part on one or more of: a power class of the UE, a time associated with transmitting one or more communications of the set of multiple communications, or an elevation angle of a beam associated with transmitting one or more communications of the set of multiple communications.

Aspect 11: The method of any of Aspects 7-10, wherein the UE is to maintain the channel consistency for the transmission channel based at least in part on one or more of: a power class of the UE, a time associated with transmitting one or more communications of the set of multiple communications, or an elevation angle of a beam associated with transmitting one or more communications of the set of multiple communications.

Aspect 12: A method of wireless communication performed at a user equipment (UE), comprising: performing one or more procedures that support demodulation reference signal (DMRS) bundling by a base station; and transmitting set of multiple communications based at least in part on the one or more procedures.

Aspect 13: The method of Aspect 12, wherein performing the one or more procedures comprises: performing the one or more procedures during transmissions of the set of multiple communications.

Aspect 14: The method of any of Aspects 12-13, wherein performing the one or more procedures that support DMRS bundling by the base station comprises one or more of: maintaining phase continuity for the set of multiple communications, or maintaining power consistency for the set of multiple communications.

Aspect 15: The method of any of Aspects 12-14, wherein the set of multiple communications comprise repetitions of a random access channel message.

Aspect 16: The method of any of Aspects 12-15, wherein a transmission channel used for transmitting the set of multiple communications is associated with a non-terrestrial network.

Aspect 17: The method of any of Aspects 12-16, wherein performing the one or more procedures that support DMRS bundling by the base station is based at least in part on a one or more of: parameters, within a communication protocol, indicating to perform the one or more procedures that support DMRS bundling by the base station, a power class of the UE, a frequency band of a transmission channel used by the UE for transmitting the set of multiple communications, an orbit type of the satellite associated with the set of multiple communications, or an orbit altitude of the satellite associated with the set of multiple communications.

Aspect 18: The method of any of Aspects 12-17, further comprising: initiating, before transmitting one or more communications of the set of multiple communications, an access procedure based at least in part on a UE capability to perform the one or more procedures that support DMRS bundling by the base station.

Aspect 19: The method of any of Aspects 12-18, further comprising: receiving an indication to perform the one or more procedures that support DMRS bundling by the base station.

Aspect 20: The method of Aspect 19, wherein receiving the indication to perform the one or more procedures that support DMRS bundling by the base station comprises: receiving the indication via a system information block.

Aspect 21: The method of any of Aspects 19-20, wherein the indication indicates that the UE is required to perform the one or more procedures that support DMRS bundling by the base station.

Aspect 22: The method of Aspect 21, wherein the UE is required to perform the one or more procedures that support DMRS bundling by the base station based at least in part on one or more of: a power class of the UE, a time associated with transmitting one or more communications of the set of multiple communications, or an elevation angle of a beam associated with transmitting one or more communications of the set of multiple communications.

Aspect 23: The method of any of Aspects 19-22, wherein the UE is to perform the one or more procedures that support DMRS bundling by the base station based at least in part on one or more of: a power class of the UE, a time associated with transmitting one or more communications of the set of multiple communications, or an elevation angle of a beam associated with transmitting one or more communications of the set of multiple communications.

Aspect 24: A method of wireless communication performed at a user equipment (UE), comprising: configuring one or more transmission parameters to maintain a channel consistency for a transmission channel; and transmitting an indication, within a set of multiple communications, indicating application of the one or more transmission parameters associated with maintenance of the channel consistency for the set of multiple communications.

Aspect 25: The method of Aspect 24, wherein configuring the one or more transmission parameters to maintain the channel consistency for the transmission channel comprises one or more of: maintaining phase continuity for the set of multiple communications, or maintaining power consistency for the set of multiple communications.

Aspect 26: The method of any of Aspects 24-25, wherein the set of multiple communications comprise repetitions of a random access channel message.

Aspect 27: The method of any of Aspects 24-26, wherein the transmission channel is associated with a non-terrestrial network.

Aspect 28: The method of any of Aspects 24-27, wherein configuring the one or more transmission parameters to maintain the channel consistency for the transmission channel is based at least in part on a one or more of: parameters, within a communication protocol, indicating to maintain the channel consistency for the transmission channel, a power class of the UE, a frequency band of the transmission channel, an orbit type of a satellite associated with the set of multiple communications, or an orbit altitude of the satellite associated with the set of multiple communications.

Aspect 29: The method of any of Aspects 24-28, further comprising: initiating, before transmitting the indication within the set of multiple communications, an access procedure based at least in part on a UE capability to configure the one or more transmission parameters to maintain the channel consistency for the transmission channel.

Aspect 30: The method of any of Aspects 24-29, further comprising: receiving an indication to maintain the channel consistency for the transmission channel.

Aspect 31: The method of Aspect 30, wherein receiving the indication to maintain the channel consistency for the transmission channel comprises: receiving the indication via a system information block.

Aspect 32: The method of any of Aspects 30-31, wherein the indication indicates that the UE is required to maintain the channel consistency for the transmission channel.

Aspect 33: The method of Aspect 32, wherein the UE is required to maintain the channel consistency for the transmission channel based at least in part on one or more of: a power class of the UE, a time associated with transmitting one or more communications of the set of multiple communications, or an elevation angle of a beam associated with transmitting one or more communications of the set of multiple communications.

Aspect 34: The method of any of Aspects 30-33, wherein the UE is to maintain the channel consistency for the transmission channel based at least in part on one or more of: a power class of the UE, a time associated with transmitting one or more communications of the set of multiple communications, or an elevation angle of a beam associated with transmitting one or more communications of the set of multiple communications.

Aspect 35: The method of any of Aspects 24-34, wherein transmitting the indication within the set of multiple communications comprises: transmitting the indication within a bitfield that is multiplexed with a random access channel communication.

Aspect 36: The method of any of Aspects 24-35, wherein transmitting the indication within the set of multiple communications comprises: transmitting the indication implicitly based at least in part on whether the UE alternates DMRS ports during transmission of the set of multiple communications.

Aspect 37: A method of wireless communication performed at a user equipment (UE), comprising: performing one or more procedures that support demodulation reference signal (DMRS) bundling by a base station; and transmitting an indication, within a set of multiple communications, indicating performance of the one or more procedures that support the DMRS bundling for the set of multiple communications.

Aspect 38: The method of Aspect 37, wherein performing the one or more procedures comprises: performing the one or more procedures during transmission of the set of multiple communications.

Aspect 39: The method of any of Aspects 37-38, wherein performing the one or more procedures that support DMRS bundling by the base station comprises one or more of: maintaining phase continuity for the set of multiple communications, or maintaining power consistency for the set of multiple communications.

Aspect 40: The method of any of Aspects 37-39, wherein the set of multiple communications comprise repetitions of a random access channel message.

Aspect 41: The method of any of Aspects 37-40, wherein a transmission channel used for transmitting the indication within the set of multiple communications is associated with a non-terrestrial network.

Aspect 42: The method of any of Aspects 37-41, wherein performing the one or more procedures that support DMRS bundling by the base station is based at least in part on a one or more of: parameters, within a communication protocol, indicating to perform the one or more procedures that support DMRS bundling by the base station, a power class of the UE, a frequency band of a transmission channel used by the UE for transmitting the set of multiple communications, an orbit type of the satellite associated with the set of multiple communications, or an orbit altitude of the satellite associated with the set of multiple communications.

Aspect 43: The method of any of Aspects 37-42, further comprising: initiating, before transmitting the indication within the set of multiple communications, an access procedure based at least in part on a UE capability to perform the one or more procedures that support DMRS bundling by the base station.

Aspect 44: The method of any of Aspects 37-43, further comprising: receiving an indication to perform the one or more procedures that support DMRS bundling by the base station.

Aspect 45: The method of Aspect 44, wherein receiving the indication to perform the one or more procedures that support DMRS bundling by the base station comprises: receiving the indication via a system information block.

Aspect 46: The method of any of Aspects 44-45, wherein the indication indicates that the UE is required to perform the one or more procedures that support DMRS bundling by the base station.

Aspect 47: The method of Aspect 46, wherein the UE is required to perform the one or more procedures that support DMRS bundling by the base station based at least in part on one or more of: a power class of the UE, a time associated with transmitting one or more communications of the set of multiple communications, or an elevation angle of a beam associated with transmitting one or more communications of the set of multiple communications.

Aspect 48: The method of any of Aspects 44-47, wherein the UE is to perform the one or more procedures that support DMRS bundling by the base station based at least in part on one or more of: a power class of the UE, a time associated with transmitting one or more communications of the set of multiple communications, or an elevation angle of a beam associated with transmitting one or more communications of the set of multiple communications.

Aspect 49: The method of any of Aspects 37-48, wherein transmitting the indication within the set of multiple communications comprises: transmitting the indication within a bitfield that is multiplexed with a random access channel communication.

Aspect 50: The method of any of Aspects 37-49, wherein transmitting the indication within the set of multiple communications comprises: transmitting the indication implicitly based at least in part on whether the UE alternates DMRS ports during transmission of the set of multiple communications.

Aspect 51: A method of wireless communication performed by a base station, comprising: receiving, from a user equipment (UE) via a transmission channel, a set of multiple communications; and applying demodulation reference signal (DMRS) bundling across the set of multiple communications based at least in part on an indication comprising one or more of: a first indication within a communication protocol for the UE to support DMRS bundling, a second indication, from the base station, to support DMRS bundling, or a third indication within the set of multiple communications.

Aspect 52: The method of Aspect 51, wherein the indication indicates that the UE is to perform one or more of: maintenance of phase continuity for the set of multiple communications, or maintenance of power consistency for the set of multiple communications.

Aspect 53: The method of any of Aspects 51-52, wherein the set of multiple communications comprise repetitions of a random access channel message.

Aspect 54: The method of any of Aspects 51-53, wherein the transmission channel is associated with a non-terrestrial network.

Aspect 55: The method of any of Aspects 51-54, wherein applying DMRS bundling across the set of multiple communications is based at least in part on a one or more of: a power class of the UE, a frequency band of the transmission channel, an orbit type of a satellite associated with the set of multiple communications, or an orbit altitude of the satellite associated with the set of multiple communications.

Aspect 56: The method of any of Aspects 51-55, further comprising: receiving, before receiving one or more communications of the set of multiple communications, an access message based at least in part on a UE capability to support DMRS bundling.

Aspect 57: The method of any of Aspects 51-56, further comprising: transmitting the second indication to support DMRS bundling, wherein the second indication to support DMRS bundling comprises one or more of: a fourth indication to maintain channel consistency for the transmission channel, or a fifth indication to perform one or more procedures that support DMRS bundling for the set of multiple communications.

Aspect 58: The method of Aspect 57, wherein transmitting the second indication to support DMRS bundling comprises: transmitting the indication via a system information block.

Aspect 59: The method of any of Aspects 51-58, wherein the indication indicates that the UE is required to maintain the channel consistency for the transmission channel.

Aspect 60: The method of Aspect 59, wherein the UE is required to maintain the channel consistency for the transmission channel based at least in part on one or more of: a power class of the UE, a time associated with transmitting one or more communications of the set of multiple communications, or an elevation angle of a beam associated with transmitting one or more communications of the set of multiple communications.

Aspect 61: The method of any of Aspects 57-60, wherein the indication indicates that the UE is to maintain the channel consistency for the transmission channel based at least in part on one or more of: a power class of the UE, a time associated with transmitting one or more communications of the set of multiple communications, or an elevation angle of a beam associated with transmitting one or more communications of the set of multiple communications.

Aspect 62: The method of any of Aspects 51-61, wherein the second indication to support DMRS bundling comprises one or more of: an indication to maintain channel consistency for the transmission channel, or an indication to perform one or more procedures that support DMRS bundling by the base station.

Aspect 63: A method of wireless communication performed by a base station, comprising: receiving, from a user equipment (UE) via a transmission channel, a set of multiple communications; and applying demodulation reference signal (DMRS) bundling across the set of multiple communications based at least in part on an indication within the set of multiple communications.

Aspect 64: The method of Aspect 63, wherein the indication within the set of multiple communications comprises one or more of: an indication of application of one or more transmission parameters associated with maintenance of channel consistency for the set of multiple communications, or performance of one or more procedures that support DMRS bundling for the set of multiple communications.

Aspect 65: The method of Aspect 64, wherein the one or more transmission parameters to maintain the channel consistency for the transmission channel comprise one or more of: maintenance of phase continuity for the set of multiple communications, or maintenance of power consistency for the set of multiple communications.

Aspect 66: The method of any of Aspects 63-65, wherein the set of multiple communications comprise repetitions of a random access channel message.

Aspect 67: The method of any of Aspects 63-66, wherein the transmission channel is associated with a non-terrestrial network.

Aspect 68: The method of any of Aspects 63-67, further comprising: receiving, before receiving one or more communications of the set of multiple communications, an access message based at least in part on a UE capability to support DMRS bundling.

Aspect 69: The method of any of Aspects 63-68, further comprising transmitting an indication to support DMRS bundling, wherein the indication to support DMRS bundling comprises one or more of: a first indication to maintain channel consistency for the transmission channel, or a second indication to perform one or more procedures that support DMRS bundling for the set of multiple communications.

Aspect 70: The method of Aspect 69, wherein transmitting the indication to support DMRS bundling comprises: transmitting the indication via a system information block.

Aspect 71: The method of any of Aspects 69-70, wherein the indication indicates that the UE is required to support DMRS bundling.

Aspect 72: The method of Aspect 71, wherein the indication indicates that the UE is required to support DMRS bundling based at least in part on one or more of: a power class of the UE, a time associated with transmitting one or more communications of the set of multiple communications, or an elevation angle of a beam associated with transmitting one or more communications of the set of multiple communications.

Aspect 73: The method of any of Aspects 69-72, wherein the indication indicates that the UE is to support DMRS bundling based at least in part on one or more of: a power class of the UE, a time associated with transmitting one or more communications of the set of multiple communications, or an elevation angle of a beam associated with transmitting one or more communications of the set of multiple communications.

Aspect 74: The method of any of Aspects 63-73, wherein receiving the indication within the set of multiple communications comprises: receiving the indication within a bit-field that is multiplexed with a random access channel communication.

Aspect 75: The method of any of Aspects 63-74, wherein receiving the indication within the set of multiple communications comprises: receiving the indication implicitly based at least in part on whether the UE alternates DMRS ports during transmission of the set of multiple communications.

Aspect 76: An apparatus for wireless communication at a device, comprising a processor; memory coupled with the processor; and instructions stored in the memory and executable by the processor to cause the apparatus to perform the method of one or more of Aspects 1-75.

Aspect 77: A device for wireless communication, comprising a memory and one or more processors coupled to the memory, the one or more processors configured to perform the method of one or more of Aspects 1-75.

Aspect 78: An apparatus for wireless communication, comprising at least one means for performing the method of one or more of Aspects 1-75.

Aspect 79: A non-transitory computer-readable medium storing code for wireless communication, the code comprising instructions executable by a processor to perform the method of one or more of Aspects 1-75.

Aspect 80: A non-transitory computer-readable medium storing a set of instructions for wireless communication, the set of instructions comprising one or more instructions that, when executed by one or more processors of a device, cause the device to perform the method of one or more of Aspects 1-75.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to cause the UE to:

configure one or more transmission parameters to maintain a channel consistency for a transmission channel, wherein the configuration of the one or more transmission parameters is based at least in part on one or more of an orbit type of a satellite associated with a set of multiple communications or an orbit altitude of the satellite associated with the set of multiple communications; and transmit, via the transmission channel and using the one or more transmission parameters, the set of multiple communications, wherein the set of multiple communications comprises repetitions of a random access channel message.

2. The apparatus of claim 1, wherein the one or more processors, to configure the one or more transmission parameters to maintain the channel consistency for the transmission channel, are configured to cause the UE to:

maintain phase continuity for the set of multiple communications, or maintain power consistency for the set of multiple communications.

3. The apparatus of claim 1, wherein the transmission channel is associated with a non-terrestrial network.

4. The apparatus of claim 1, wherein the configuration of the one or more transmission parameters to maintain the channel consistency for the transmission channel is further based at least in part on a one or more of:

parameters, within a communication protocol, that comprise an indication to maintain the channel consistency for the transmission channel, a power class of the UE, or a frequency band of the transmission channel.

5. The apparatus of claim 1, wherein the one or more processors are further configured to cause the UE to:

initiate, before transmission of one or more communications of the set of multiple communications, an access procedure based at least in part on a UE capability to configure the one or more transmission parameters to maintain the channel consistency for the transmission channel.

6. The apparatus of claim 1, wherein the one or more processors are further configured to cause the UE to:

receive an indication to maintain the channel consistency for the transmission channel.

7. The apparatus of claim 6, wherein the one or more processors, to receive the indication to maintain the channel consistency for the transmission channel, are configured to cause the UE to:

receive the indication via a system information block.

8. The apparatus of claim 6, wherein the indication to maintain the channel consistency for the transmission channel indicates that the UE is required to maintain the channel consistency for the transmission channel.

9. The apparatus of claim 8, wherein the UE is required to maintain the channel consistency for the transmission channel based at least in part on one or more of:

a power class of the UE, a time associated with transmission of one or more communications of the set of multiple communications, or an elevation angle of a beam associated with the transmission of the one or more communications of the set of multiple communications.

10. The apparatus of claim 6, wherein the UE is to maintain the channel consistency for the transmission channel based at least in part on one or more of:

a power class of the UE, a time associated with transmission of one or more communications of the set of multiple communications, or an elevation angle of a beam associated with the transmission of the one or more communications of the set of multiple communications.

11. The apparatus of claim 1, wherein the repetitions of the random access channel message comprise repetitions of a Msg3 communication of a random access channel (RACH) procedure.

12. An apparatus for wireless communication at a user equipment (UE), comprising:

one or more memories; and one or more processors, coupled to the one or more memories, configured to cause the UE to:

configure one or more transmission parameters to maintain a channel consistency for a transmission channel; and transmit an indication of application of the one or more transmission parameters associated with maintenance of the channel consistency for a set of multiple communications, wherein the indication is transmitted within the set of multiple communications, wherein the set of multiple communications comprises repetitions of a random access channel message.

13. The apparatus of claim 12, wherein the one or more processors, to configure the one or more transmission parameters to maintain the channel consistency for the transmission channel, are configured to cause the UE to:

maintain phase continuity for the set of multiple communications, or maintain power consistency for the set of multiple communications.

14. The apparatus of claim 12, wherein the transmission channel is associated with a non-terrestrial network.

15. The apparatus of claim 12, wherein the configuration of the one or more transmission parameters to maintain the channel consistency for the transmission channel is further based at least in part on one or more of:

parameters, within a communication protocol, that comprise an indication to maintain the channel consistency for the transmission channel, a power class of the UE, a frequency band of the transmission channel, an orbit type of a satellite associated with the set of multiple communications, or an orbit altitude of the satellite associated with the set of multiple communications.

16. The apparatus of claim 12, wherein the one or more processors are further configured to cause the UE to:

initiate, before the transmission of the indication, an access procedure based at least in part on a UE capability to configure the one or more transmission parameters to maintain the channel consistency for the transmission channel.

17. The apparatus of claim 12, wherein the one or more processors are further configured to cause the UE to:

receive an indication to maintain the channel consistency for the transmission channel.

18. The apparatus of claim 17, wherein the one or more processors, to receive the indication to maintain the channel consistency for the transmission channel, are configured to cause the UE to:

receive the indication to maintain the channel consistency via a system information block.

19. The apparatus of claim 17, wherein the indication to maintain the channel consistency indicates that the UE is required to maintain the channel consistency for the transmission channel.

20. The apparatus of claim 17, wherein the apparatus is to maintain the channel consistency for the transmission channel based at least in part on one or more of:

a power class of the UE, a time associated with transmission of one or more communications of the set of multiple communications, or an elevation angle of a beam associated with transmission of one or more communications of the set of multiple communications.

21. The apparatus of claim 12, wherein the one or more processors, to transmit the indication within the set of multiple communications, are configured to cause the UE to:

transmit the indication within a bitfield that is multiplexed with a random access channel communication.

22. The apparatus of claim 12, wherein the one or more processors, to transmit the indication within the set of multiple communications, are configured to cause the UE to:

transmit the indication implicitly based at least in part on whether the UE alternates DMRS ports during transmission of the set of multiple communications.

23. The apparatus of claim 12, wherein the repetitions of the random access channel message comprise repetitions of a Msg3 communication of a random access channel (RACH) procedure.

24. An apparatus for wireless communication at a network entity, comprising:

one or more memories; and one or more processors, coupled to the one or more memories, configured to cause the network entity to:

receive, via a transmission channel, a set of multiple communications, wherein the set of multiple communications comprises repetitions of a random access channel message; and apply demodulation reference signal (DMRS) bundling across the set of multiple communications based at least in part on an indication comprising one or more of:

a first one or more parameters within a communication protocol for a user equipment (UE) to support DMRS bundling, a second indication, from the network entity, to support DMRS bundling, a third indication within the set of multiple communications.

25. The apparatus of claim 24, wherein the indication indicates that the UE is to perform one or more of:

maintenance of phase continuity for the set of multiple communications, or maintenance of power consistency for the set of multiple communications.

26. The apparatus of claim 24, wherein the transmission channel is associated with a non-terrestrial network.

27. The apparatus of claim 24, wherein the application of DMRS bundling across the set of multiple communications is based at least in part on one or more of:

a power class of the UE, a frequency band of the transmission channel, an orbit type of a satellite associated with the set of multiple communications, or an orbit altitude of the satellite associated with the set of multiple communications.

28. The apparatus of claim 24, wherein the one or more processors are further configured to cause the network entity to:

transmit the second indication to support DMRS bundling, wherein the second indication to support DMRS bundling comprises one or more of:

a fourth indication to maintain channel consistency for the transmission channel, or a fifth indication to perform one or more procedures that support DMRS bundling for the set of multiple communications.

29. The apparatus of claim 28, wherein the one or more processors, to cause the network entity to transmit the second indication to support DMRS bundling, are configured to cause the network entity to:

transmit the second indication via a system information block.

30. The apparatus of claim 24, wherein the repetitions of the random access channel message comprise repetitions of a Msg3 communication of a random access channel (RACH) procedure.

31. An apparatus for wireless communication at a network entity, comprising:

one or more memories; and one or more processors, coupled to the one or more memories, configured to cause the network entity:

receive, via a transmission channel, a set of multiple communications, wherein the set of multiple communications comprises repetitions of a random access channel message; and apply demodulation reference signal (DMRS) bundling across the set of multiple communications based at least in part on an indication within the set of multiple communications.

32. The apparatus of claim 31, wherein the indication within the set of multiple communications comprises one or more of:

an indication of application of one or more transmission parameters associated with maintenance of channel consistency for the set of multiple communications, or performance of one or more procedures that support DMRS bundling for the set of multiple communications.

33. The apparatus of claim 32, wherein the one or more transmission parameters associated with the maintenance of the channel consistency for the set of multiple communications comprise one or more of:

maintenance of phase continuity for the set of multiple communications, or maintenance of power consistency for the set of multiple communications.

34. The apparatus of claim 31, wherein the transmission channel is associated with a non-terrestrial network.

35. The apparatus of claim 31, wherein the repetitions of the random access channel message comprise repetitions of a Msg3 communication of a random access channel (RACH) procedure.

36. A method of wireless communication at a user equipment (UE), comprising:

configuring one or more transmission parameters to maintain a channel consistency for a transmission channel, wherein configuring the one or more transmission parameters is based at least in part on one or more of an orbit type of a satellite associated with a set of multiple communications or an orbit altitude of the satellite associated with the set of multiple communications; and transmitting, via the transmission channel and using the one or more transmission parameters, the set of multiple communications, wherein the set of multiple communications comprises repetitions of a random access channel message.

37. The method of claim 36, wherein configuring the one or more transmission parameters to maintain the channel consistency for the transmission channel further comprises:

maintaining phase continuity for the set of multiple communications, or maintaining power consistency for the set of multiple communications.

38. A method of wireless communication at a user equipment (UE), comprising:

configuring one or more transmission parameters to maintain a channel consistency for a transmission channel; and transmitting an indication of application of the one or more transmission parameters associated with maintenance of the channel consistency for a set of multiple communications, wherein the indication is transmitted within the set of multiple communications, wherein the set of multiple communications comprises repetitions of a random access channel message.

39. The method of claim 38, wherein configuring the one or more transmission parameters to maintain the channel consistency for the transmission channel further comprises:

maintaining phase continuity for the set of multiple communications, or maintaining power consistency for the set of multiple communications.

40. A method for wireless communication at a network entity, comprising:

receiving, via a transmission channel, a set of multiple communications, wherein the set of multiple communications comprises repetitions of a random access channel message; and applying demodulation reference signal (DMRS) bundling across the set of multiple communications based at least in part on an indication comprising one or more of:

a first one or more parameters within a communication protocol for a user equipment (UE) to support DMRS bundling, a second indication, from the network entity, to support DMRS bundling, or a third indication within the set of multiple communications.

41. The method of claim 40, wherein the indication indicates that the UE is to perform one or more of:

maintenance of phase continuity for the set of multiple communications, or maintenance of power consistency for the set of multiple communications.

42. A method for wireless communication at a network entity, comprising:

receiving, via a transmission channel, a set of multiple communications, wherein the set of multiple communications comprises repetitions of a random access channel message; and applying demodulation reference signal (DMRS) bundling across the set of multiple communications based at least in part on an indication within the set of multiple communications.

43. The method of claim 42, wherein the indication within the set of multiple communications comprises one or more of:

an indication of application of one or more transmission parameters associated with maintenance of channel consistency for the set of multiple communications, or performance of one or more procedures that support DMRS bundling for the set of multiple communications.

* * * * *